US007816411B2

(12) United States Patent
Tonkovich et al.

(10) Patent No.: US 7,816,411 B2
(45) Date of Patent: *Oct. 19, 2010

(54) MULTIPHASE MIXING PROCESS USING MICROCHANNEL PROCESS TECHNOLOGY

(75) Inventors: Anna Lee Tonkovich, Dublin, OH (US); Laura J. Silva, Dublin, OH (US); David John Hesse, Columbus, OH (US); Michael Alan Marchiando, London, OH (US); Micheal Jay Lamont, Hilliard, OH (US); Dongming Qiu, Bothell, WA (US); Terence Andrew Dritz, Worthington, OH (US); Kristina M. Pagnotto, Cincinnati, OH (US); Richard Stevenson, Columbus, OH (US); Steven T. Perry, Galloway, OH (US); Maddalena Fanelli, Columbus, OH (US); Ravi Arora, New Albany, OH (US); Bin Yang, Columbus, OH (US); Sean Patrick Fitzgerald, Columbus, OH (US); Timothy J. Sullivan, Dublin, OH (US); Kai Tod Paul Jarosch, Bexley, OH (US); Thomas Yuschak, Lewis Center, OH (US)

(73) Assignee: Velocys, Inc., Plain City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/623,780

(22) Filed: Nov. 23, 2009

(65) Prior Publication Data

US 2010/0068366 A1 Mar. 18, 2010

Related U.S. Application Data

(63) Continuation of application No. 11/241,813, filed on Sep. 30, 2005, now Pat. No. 7,622,509.

(51) Int. Cl.
*B01F 3/04* (2006.01)
*B01F 3/06* (2006.01)

(52) U.S. Cl. .............................. 516/10; 516/11; 516/38; 516/928; 516/929

(58) Field of Classification Search ................... 507/10, 507/11, 38, 928, 929; 516/10, 11, 38, 928, 516/929
See application file for complete search history.

(56) References Cited

U.S. PATENT DOCUMENTS 3,489,690 A  1/1970  Lachampt et al. ........... 252/308

(Continued)

FOREIGN PATENT DOCUMENTS

CA  2247662  3/1999

(Continued)

OTHER PUBLICATIONS

Kestenbaum; "Synthesis of ethylene oxide in a microreaction system"; *Microreaction Technology: Industrial Prospects*; IMRET 3: Proceedings of the Third International Converence on Microreaction Technology.

(Continued)

*Primary Examiner*—Timothy J. Kugel

(57) ABSTRACT

The disclosed invention relates to a process for making a multiphase mixture, comprising: flowing a first fluid stream through a process microchannel, the first fluid stream comprising at least one liquid and/or at least one gas, the process microchannel having an apertured section; flowing a second fluid stream through the apertured section into the process microchannel in contact with the first fluid stream to form the multiphase mixture, the second fluid stream comprising at least one gas and/or at least one microbody-forming material, the first fluid stream forming a continuous phase in the multiphase mixture, the second fluid stream forming a discontinuous phase dispersed in the continuous phase.

63 Claims, 14 Drawing Sheets

U.S. PATENT DOCUMENTS

| | | | |
|---|---|---|---|
| 4,392,362 A | 7/1983 | Little | 62/514 |
| 4,516,632 A | 5/1985 | Swift et al. | 165/167 |
| 5,075,113 A | 12/1991 | DuBois | 424/450 |
| 5,309,637 A | 5/1994 | Moriarty | 29/890.054 |
| 5,317,805 A | 6/1994 | Hoopman et al. | 29/890.03 |
| 5,597,773 A | 1/1997 | Evans et al. | 502/348 |
| 5,611,214 A | 3/1997 | Wegeng et al. | 62/498 |
| 5,689,966 A | 11/1997 | Zess et al. | 62/238.6 |
| 5,727,618 A | 3/1998 | Mundinger et al. | 165/80.4 |
| 5,811,062 A | 9/1998 | Wegeng et al. | 422/129 |
| 5,858,314 A | 1/1999 | Hsu et al. | 422/211 |
| 5,997,826 A | 12/1999 | Lodeng et al. | 422/190 |
| 6,056,932 A | 5/2000 | von Hippel et al. | 423/376 |
| 6,126,723 A | 10/2000 | Drost et al. | 96/4 |
| 6,129,973 A | 10/2000 | Martin et al. | 428/166 |
| 6,155,710 A | 12/2000 | Nakajima et al. | 366/167.1 |
| 6,159,358 A | 12/2000 | Mulvaney, III et al. | 423/376 |
| 6,192,596 B1 | 2/2001 | Bennett et al. | 34/76 |
| 6,200,536 B1 | 3/2001 | Tonkovich et al. | 422/177 |
| 6,203,791 B1 | 3/2001 | Protopapa et al. | 424/94.64 |
| 6,216,343 B1 | 4/2001 | Leland et al. | 29/890.032 |
| 6,220,497 B1 | 4/2001 | Benz et al. | 228/118 |
| 6,230,408 B1 | 5/2001 | Ehrfeld et al. | 29/890.039 |
| 6,258,858 B1 | 7/2001 | Nakajima et al. | 516/73 |
| 6,281,254 B1 | 8/2001 | Nakajima et al. | 516/53 |
| 6,284,217 B1 | 9/2001 | Wang et al. | 423/651 |
| 6,313,393 B1 | 11/2001 | Drost | 136/201 |
| 6,352,577 B1 | 3/2002 | Martin et al. | 96/4 |
| 6,381,846 B2 | 5/2002 | Insley et al. | 29/890.039 |
| 6,387,301 B1 | 5/2002 | Nakajima et al. | 264/4.4 |
| 6,409,072 B1 | 6/2002 | Breuer et al. | 228/111.5 |
| 6,415,860 B1 | 7/2002 | Kelly et al. | 165/748 |
| 6,431,695 B1 | 8/2002 | Johnston et al. | 347/86 |
| 6,440,895 B1 | 8/2002 | Tonkovich et al. | 502/439 |
| 6,451,864 B1 | 9/2002 | Wang et al. | 518/715 |
| 6,479,428 B1 | 11/2002 | Tonkovich et al. | 502/302 |
| 6,488,838 B1 | 12/2002 | Tonkovich et al. | 208/108 |
| 6,490,812 B1 | 12/2002 | Bennett et al. | 34/433 |
| 6,491,880 B1 | 12/2002 | Wang et al. | 422/211 |
| 6,503,298 B1 | 1/2003 | Monzyk et al. | 95/96 |
| 6,508,862 B1 | 1/2003 | Tonkovich et al. | 95/106 |
| 6,533,840 B2 | 3/2003 | Martin et al. | 95/45 |
| 6,540,975 B2 | 4/2003 | Tonkovich et al. | 423/659 |
| 6,546,998 B2 | 4/2003 | Oh et al. | 165/110 |
| 6,558,634 B1 | 5/2003 | Wang et al. | 422/173 |
| 6,607,678 B2 | 8/2003 | Wang et al. | 252/373 |
| 6,616,909 B1 | 9/2003 | Tonkovich et al. | 423/648.1 |
| 6,622,519 B1 | 9/2003 | Mathias et al. | 62/611 |
| 6,652,627 B1 | 11/2003 | Tonkovich et al. | 95/104 |
| 6,660,237 B2 | 12/2003 | Wang et al. | 422/222 |
| 6,666,909 B1 | 12/2003 | TeGrotenhuis et al. | 95/273 |
| 6,675,875 B1 | 1/2004 | Vafai et al. | 165/80.4 |
| 6,680,044 B1 | 1/2004 | Tonkovich et al. | 423/652 |
| 6,713,036 B1 | 3/2004 | Vanden Bussche et al. | 423/584 |
| 6,734,137 B2 | 5/2004 | Wang et al. | 502/328 |
| 6,746,651 B1 | 6/2004 | Ponzo et al. | 422/220 |
| 6,746,819 B1 | 6/2004 | Schmitz et al. | 430/272.1 |
| 6,747,178 B1 | 6/2004 | Harston et al. | 570/175 |
| 6,749,814 B1 | 6/2004 | Bergh et al. | 422/130 |
| 6,749,817 B1 | 6/2004 | Mulvaney, III | 422/200 |
| 6,755,211 B1 | 6/2004 | O'Connor et al. | 137/554 |
| 6,762,149 B2 | 7/2004 | Tonkovich et al. | 502/439 |
| 6,769,444 B2 | 8/2004 | Guzman et al. | 137/15.01 |
| 6,773,684 B2 | 8/2004 | Lesieur et al. | 422/198 |
| 6,814,781 B2 | 11/2004 | Tonkovich et al. | 95/90 |
| 6,851,171 B2 | 2/2005 | Schmitt | 29/469 |
| 6,916,113 B2 | 7/2005 | Van de Goor et al. | 366/108 |
| 6,935,768 B2 | 8/2005 | Lowe et al. | 366/167.1 |
| 6,935,772 B2 | 8/2005 | Karp et al. | 366/341 |
| 6,955,738 B2 | 10/2005 | Derand et al. | 156/272.6 |
| 6,969,746 B2 | 11/2005 | Krull et al. | 526/64 |
| 7,001,576 B2 | 2/2006 | Hohmann et al. | 422/224 |
| 7,378,473 B2 | 5/2008 | Torii et al. | |
| 7,622,509 B2 * | 11/2009 | Tonkovich et al. | 516/18 |
| 2001/0018140 A1 | 8/2001 | Hermann et al. | 429/20 |
| 2002/0028164 A1 | 3/2002 | Schutte et al. | 422/198 |
| 2002/0071797 A1 | 6/2002 | Loffler et al. | 422/190 |
| 2002/0192118 A1 | 12/2002 | Zech et al. | 422/99 |
| 2003/0007904 A1 | 1/2003 | Tonkovich et al. | 422/180 |
| 2003/0027858 A1 | 2/2003 | Lambert et al. | 514/458 |
| 2003/0045747 A1 | 3/2003 | Wurziger et al. | 562/418 |
| 2003/0116503 A1 | 6/2003 | Wang et al. | 210/660 |
| 2003/0190563 A1 | 10/2003 | Nagasawa et al. | 430/569 |
| 2003/0201022 A1 | 10/2003 | Kawai et al. | 137/828 |
| 2003/0219903 A1 | 11/2003 | Wang et al. | 436/37 |
| 2004/0011413 A1 | 1/2004 | Fujii et al. | 137/896 |
| 2004/0027915 A1 | 2/2004 | Lowe et al. | 366/341 |
| 2004/0029977 A1 | 2/2004 | Kawa et al. | 514/786 |
| 2004/0034111 A1 | 2/2004 | Tonkovich et al. | 518/726 |
| 2004/0037161 A1 | 2/2004 | Honda et al. | 366/176.1 |
| 2004/0055329 A1 | 3/2004 | Mathias et al. | 62/611 |
| 2004/0104010 A1 | 6/2004 | Kenny et al. | 165/80.4 |
| 2004/0123626 A1 | 7/2004 | Caze et al. | 65/17.2 |
| 2004/0125689 A1 | 7/2004 | Ehrfeld et al. | 366/165.1 |
| 2004/0130057 A1 | 7/2004 | Mehrabi et al. | 264/171.13 |
| 2004/0131345 A1 | 7/2004 | Kylberg et al. | 392/465 |
| 2004/0131829 A1 | 7/2004 | Joseph et al. | 428/166 |
| 2004/0136902 A1 | 7/2004 | Plath et al. | 423/651 |
| 2004/0141893 A1 | 7/2004 | Martin | 422/198 |
| 2004/0143059 A1 | 7/2004 | Cabrera | 524/800 |
| 2004/0144421 A1 | 7/2004 | Parce et al. | 137/14 |
| 2004/0156762 A1 | 8/2004 | Schuppich et al. | 422/191 |
| 2004/0188326 A1 | 9/2004 | Tonkovich et al. | 208/139 |
| 2004/0220434 A1 | 11/2004 | Brophy et al. | 568/959 |
| 2004/0228781 A1 | 11/2004 | Tonkovich et al. | 422/222 |
| 2004/0228882 A1 | 11/2004 | Qiu et al. | 424/400 |
| 2004/0229752 A1 | 11/2004 | Long et al. | 502/303 |
| 2004/0234566 A1 | 11/2004 | Qiu et al. | 424/401 |
| 2005/0045030 A1 | 3/2005 | Tonkovich et al. | 95/90 |
| 2005/0133457 A1 | 6/2005 | Tonkovich et al. | 210/739 |
| 2005/0152690 A1 | 7/2005 | Nagasawa et al. | 396/142 |
| 2005/0161326 A1 | 7/2005 | Morita et al. | 204/450 |
| 2005/0163701 A1 | 7/2005 | Tonkovich et al. | 423/584 |
| 2005/0165121 A1 | 7/2005 | Wang et al. | 518/726 |
| 2005/0176832 A1 | 8/2005 | Tonkovich et al. | 518/726 |
| 2005/0232076 A1 | 10/2005 | Yang et al. | 366/336 |
| 2005/0233040 A1 | 10/2005 | Ehrfeld et al. | 426/518 |
| 2005/0279491 A1 | 12/2005 | Thome et al. | 165/272 |
| 2006/0077755 A1 | 4/2006 | Higuchi et al. | 366/336 |
| 2006/0121122 A1 | 6/2006 | Nakajima et al. | 424/490 |
| 2006/0128815 A1 | 6/2006 | Clare et al. | 516/9 |

FOREIGN PATENT DOCUMENTS

| | | |
|---|---|---|
| EP | 0 885 086 B1 | 8/2001 |
| EP | 1 125 630 A2 | 8/2001 |
| EP | 1 311 341 B1 | 8/2001 |
| EP | 0 904 608 B1 | 12/2001 |
| EP | 1 232 790 A1 | 8/2002 |
| EP | 1 171 227 B1 | 6/2003 |
| EP | 1 382 382 A1 | 7/2003 |
| EP | 1 362 634 A1 | 11/2003 |
| EP | 1 180 062 B1 | 3/2004 |
| EP | 1 390 131 B1 | 7/2005 |
| EP | 1 289 660 B1 | 8/2006 |
| EP | 1 510 251 B1 | 9/2006 |
| EP | 1 726 577 A1 | 11/2006 |
| JP | 05279523 | 10/2005 |
| JP | 05211857 | 11/2005 |
| JP | 05213334 | 11/2005 |
| WO | 97/32687 | 9/1997 |
| WO | 98/30205 | 7/1998 |
| WO | 98/55812 | 12/1998 |
| WO | 99/48805 | 9/1999 |

| | | |
|---|---|---|
| WO | 00/06295 | 10/2000 |
| WO | 01/10773 A1 | 2/2001 |
| WO | 01/12312 A2 | 2/2001 |
| WO | 01/43857 A1 | 6/2001 |
| WO | 01/54807 A1 | 8/2001 |
| WO | 01/95237 A2 | 12/2001 |
| WO | 02/14854 A1 | 2/2002 |
| WO | 02/064248 A2 | 8/2002 |
| WO | 03/068381 A1 | 8/2003 |
| WO | 03/078052 A1 | 9/2003 |
| WO | 03/106386 A2 | 12/2003 |
| WO | 2004/016347 A2 | 2/2004 |
| WO | 2004/101138 A1 | 5/2004 |
| WO | 2004/037418 A1 | 6/2004 |
| WO | 2004/045760 | 6/2004 |
| WO | 2004/050799 | 6/2004 |
| WO | 2004/052518 | 6/2004 |
| WO | 2004/052530 | 6/2004 |
| WO | 2004/052941 | 6/2004 |
| WO | 2004/054013 | 6/2004 |
| WO | 2004/054696 | 7/2004 |
| WO | 2004/062790 | 7/2004 |
| WO | 2004/062791 | 7/2004 |
| WO | 2004/062792 | 7/2004 |
| WO | 2004/067160 | 8/2004 |
| WO | 2004/067444 | 8/2004 |
| WO | 2004/067492 | 8/2004 |
| WO | 2004/067708 | 8/2004 |
| WO | 2004/091771 A1 | 10/2004 |
| WO | 2004/099113 A1 | 11/2004 |
| WO | 2005/003025 A2 | 1/2005 |
| WO | 2005/079964 A1 | 1/2005 |
| WO | 2005/104323 A2 | 3/2005 |
| WO | 2005/058477 A1 | 6/2005 |
| WO | 2005/063368 A2 | 7/2005 |
| WO | 2005/077508 A1 | 8/2005 |

OTHER PUBLICATIONS

Besser, Ronald S. "New Directions in Reactor Design Through Miniaturization". Sep. 13, 2002, Tulane Engineering Forum.

Ouyang et al. "Flexible Microreactor System for Chemical Research at Moderate and High Temperatures". Stevens Institute of Technology.

Gohring et al.; "Gas Phase Reactions in Ceramic Microreactors"; IMERT 6, 10-14, Mar. 2002, New Orleans, USA, AIChE Conference Proceedings 55-60.

Hsing et al.; "Simulation of Microchannel Chemical Reactors for Heterogeneous Partial Oxidation Reactions"; Chemical Engineering Science 55 (2000) 3-13.

Matlosz et al.; "Microreactors as Tools in Chemical Research"; Microreaction Technology; IMRET 5: Proceedings of the Fifth International Conference on Microreaction Technology. (May 27-30, 2001).

Srinivasn et al.; "Micromachined Reactors for Catalytic Partial Oxidation Reactions"; AIChE Journal; Nov. 1997; vol. 43, No. 11; pp. 3059-3069.

TeGrotenhuis et al.; Optimizing Microchannel Reactors by Trading-Off Equilibrium and Reaction Kinetics through Temperature Management; Prepared for presentation at IMRET 6—6$^{th}$ International Conference on Microreaction Technology; Mar. 10-14, 2002.

Wegeng et al.; "Compact Fuel Processors for Fuel Cell Powered Automobiles Based on Microchannel Technology"; Fuel Cells Bulletin No. 28; pp. 8-13.

Rostami et al.; "Flow and Heat Transfer for Gas Flowing in Microchannels: a Review"; Heat and Mass Transfer 38 (2002) 359-367.

Matlosz et al.; "Selective Oxidation of 1-Butene to Maleic Anhydride—Comparison of the Performance between Microchannel Reactors and a Fixed Bed Reactor"; Microreaction Technology; IMRET 5: Proceedings of the Fifth International Conference on Microreaction Technology. (2001).

Steinfeldt et al.; "Comparative Studies of the Oxidative Dehydrogenation of Propane in Micro-Channels Reactor Module and Fixed-Bed Reactor"; Studies in Surface Science and Catalysis; 2001 Elsevier Science B.V.; pp. 185-190.

Beretta et al.; "Production of Olefins via Oxidative Dehydrogenation of Light Paraffins at Short Contact Times"; Catalysis Today; 2001 Elsevier Science B.V.; pp. 103-111.

Waku et al.; "Effects of $O_2$ Concentration on the Rate and Selectivity in Oxidative Dehydrogenation of Ethane Catalyzed by Vanadium Oxide: Implications for $O_2$ Staging and Membrane Reactors"; Ind. Eng. Chem. Res. 2003, 41, 5462-5466.

Nakajima; "Novel microchannel system for monodispersed microspheres"; RIKEN Review. No. 36 (Jun. 2001); Focused on Science and Technology in Micro/Nan Scale; pp. 21-23.

Lambrich et al.; "Emulsification using microporous systems"; Journal of Membrane Science 257 (2005); pp. 76-84.

Kiwi-Minsker, et al.; "Microstructured reactors for catalytic reactions"; Catalysis Today 110 (2005); pp. 2-14.

Priest, et al.; "Generation of monodisperse gel emulsions in a microfluidic device"; Applied Physics Letters 88, 024106 (2006).

Rudhardt et al.; "Phase switching of ordered arrays of liquid crystal emulsions"; *Applied Physics Letters*; vol. 82, No. 16, Apr. 21, 2003.

Gneist et al.; "Droplet Formation in Liquid/Liquid Systems Using High Frequency AC Fields"; *Chem. Eng. Technol.* 25 (2002) 2.

Kawakatsu et al.; "Production of W/O/W emulsions and S/O/W pectin microcapsules by microchannel emulsification"; Colloids and Surfaces A: Physicochemical and Engineering Aspects 189 (2001) 257-264.

Lin; "Low-Surfactant Emulsification"; *J. Soc. Cosmet. Chem.*, 30, 167-180 (May/Jun. 1979).

Nakajima; "Novel microchannel system for monodispersed microspheres"; RIKEN Review No. 36 (Jun. 2000): Focused on Science and Technology in Micro/Nano Scale.

Iwamoto et al.; "Preparation of Gelatin Microbeads with a Narrow Size Distribution Using Microchannel Emulsification"; AAPS PharmSciTech 2002; 3 (3) article 25 (http://www.aapspharmscitech.org).

Schroder et al.; "Effect of Dynamic Interfacial Tension on the Emulsification Process Using Microporous, Ceramic Membranes"; *Journal of Colloid and Interface Science* 202, 334-340 (1998); Article No. CS985429.

Sugiura et al.; "Characterization of Spontaneous Transformation-Based Droplet Formation during Microchannel Emulsification"; *J. Phys. Chem. B* (2002), 106, pp. 9405-9409.

Tong et al.; "Surfactant Effect on Production of Monodispersed Microspheres by Microchannel Emulsification Method"; *Journal of Surfactants and Detergents*; vol. 3, No. 3 (Jul. 2000).

Umbanhowar et al.; "Monodisperse Emulsion Generation via Drop Break Off in a Coflowing Stream"; *Langmuir* 2000, 16, 347-351.

Vladisavljevic et al.; "Preparation and analysis of oil-in-water emulsions with a narrow droplet size distribution using Shirasu-porous-glass (SPG) membranes"; *Desalination* 144 (2002); pp. 167-172.

The Dow Chemical Company; "Creating New Ways for Personal Care Manufacturers to Optimize Operational Efficiency"; Dow Dispersion Sciences; Mar. 2003.

The Dow Chemical Company; "A New Approach to Creating Uniquely Functional Cosmetic Formulations"; Dow Dispersion Sciences; Mar. 2003.

The Dow Chemical Company; "Improving the Aesthetics of Personal Care Formulations"; Dow Dispersion Sciences; Mar. 2003.

Peng et al.; "Controlled Production of Emulsion Using a Crossflow Membrane"; PACE University of Exeter; www/pace.leeds.ac.uk/projects/p94x7.htm (2003).

Fraunhofer IGB, "Preparation of Emulsions using Porous Membranes in the Membrane Contactor"; www.igb.fraunhofer.de/WWW/GF/DP/en/GFDP_22_Emulgieren.en.html (2003).

Sauerstoff Sprayer, BEAUTY-INN AG; www.beauty-inn.ch/Behandlung-Sauerstoff-Spruehkosmetik.htm (2001).

Tenore et al.; "Surfactant-free emulsion systems"; Cosmetic Science & Business, 2000; www.atalink.co.uk/csb2000/html/art_rawmats_lipo-htm (2002).

MST News, Microfluidic Systems New Products, No. 17; Jul./Aug. 1996.

Abdallah et al.; "Gas-Liquid and gas-liquid-solid catalysts in a mesh microreactor"; *Chem. Commun.*, 2004, pp. 372-373.

Angeli et al.; "Modelling of Gas-Liquid Catalytic Reactions in Microchannels"; International Conference on Microreaction Technology (2000), pp. 253-259.

Besser; Stevens Institute of Technology; A Look at Microchemical Systems (Feb. 23, 2006), pp. 1-21.

Boger; "Monolithic Catalysts for the Chemical Industry"; *Ind. Eng. Chem. Res.*, 2004, 43, 4602-4611.

Chambers et al.; "Elemental fluorine Part 13. Gas-liquid thin film microreactors for selective direct fluorination"; *Lab on a Chip*, 2001, 1, 132-137.

Chambers et al.; "Elemental fluorine Part 16. Versatile thin-film-gas-liquid multi-channel microreactors for effective scale-out"; *Lab Chip*, 2005, 5, 191-198.

Chambers et al. "Elemental fluorine Part 18. Selective direct fluorination of 1,3-ketoesters and 1,3-diketones using gas/liquid microreactor technology"; *Lab Chip*, 2005, 5, 1132-1139.

Chambers et al.; "Versatile Gas/Liquid Microreactors for Industry"; *Chem. Eng. Technol.*, 2005, 28, No. 3, pp. 344-352.

Commenge et al.; "Gas-phase residence time distribution in a falling-film microreactor"; *Chemical Engineering Science* 61, 2006, 597-604.

de Bellefon et al.; "Asymmetric catalytic hydrogenations at microlitre scale ina helicoidal single channel falling film micro-reactor"; *Catalysis Today* 110 (2005), pp. 179-187.

Doku et al.; "On-microchip multiphase chemistry—a review of microreactor design principles and reagent contacting modes"; *Tetrahedron* 61 (2006), pp. 2733-2742.

McGovern et al.; "Flow Regimes in a Catalyst Trap Microreactor"; Stevens Institute of Technology.

Gunther et al.; "Transport and reaction in microscale segmented gas-liquid flow"; *Lab Chip*, 2004, 4, pp. 278-286.

Haverkamp et al.; "Characterization of a Gas/Liquid Microreactor, the Micro Bubble Column: Determination of Specific Interfacial Area"; International Conference on Microreaction Technology, 2001, pp. 202-214.

Heibel et al.; "Flooding Performance of Square Channel Monolith Structures"; *Ind. Eng. Chem. Res.* 2002, 41, pp. 6759-6771.

Heibel et al.; "Gas and liquid phase distribution and their effect on reactor performance in the monolith film flow reactor"; *Chemical Engineering Science* 56 (2001), pp. 5935-5944.

Heibel et al.; "Improving Flooding Performance for Countercurrent Monolith Reactors"; *Ind. Eng. Chem. Res.* 2004, 43, pp. 4848-4855.

Heibel et al.; "Influence of channel geometry on hydrodynamics and mass transfer in the monolith film flow reactor"; *Catalysis Today* 69 (2001), pp. 153-163.

Hessel et al.; "Gas-Liquid and Gas-Liquid-Solid Microstructured Reactors: Contacting Principles and Applications"; *Ind. Eng. Chem. Res.* 2005, 44, pp. 9750-9769.

Hessel et al.; "Gas/Liquid Microreactors for Direct Fluorination of Aromatic Compounds using Elemental Fluorine"; International Conference on Microreaction Technology, 2000, pp. 526-548.

Hessel et al.; "Gas/Liquid Microreactors: Hydrodynamics and Mass Transfer"; International Conference on Microreaction Technology, 2000, pp. 174-186.

Hessel et al.; "Microchemical Engineering: Components, Plant Concepts, User Acceptance—Part II"; *Chem. eng. Technol.* 26 (2003) 4.

Jahnisch et al.; "Direct fluorination of toluene using elemental fluorine in gas/liquid microreactors"; *Journal of Fluorine Chemistry* 105 (2000), pp. 117-128.

Khinast et al.; "Reactive mass transfer at gas-liquid interfaces: impact of micro-scale fluid dynamics on yield and selectivity of liquid-phase cyclohexane oxidation"; *Chemical Engineering Science* 58 (2003), pp. 3961-3971.

Kiwi-Minsker et al.; "Microstructured reactors for catalytic reactions"; *Catalysis Today* 110 (2005), pp. 2-14.

Koynov et al.; "Micromixing in Reactive, Deformable Bubble, and Droplet Swarms"; *Chem. Eng. Technol.* 1006, 29, No. 1, pp. 13-23.

Kreutzer et al.; "Multiphase monolith reactors: Chemical reaction engineering of segmented flow in microchannels"; *Chemical Engineering Science* 60 (2005), pp. 5895-5916.

Liu et al.; "Gas-Liquid Catalytic Hydrogenation Reaction in Small Catalyst Channel"; *AIChE Journal*, Aug. 2005, vol. 51, No. 8, pp. 2285-2297.

Losey et al.; "Design and Fabrication of Microfluidic Devices for Multiphase Mixing and Reaction"; *Journal of Microelectromechanical Systems*, vol. 11, No. 6, Dec. 2002, pp. 709-717.

Losey et al.; "A Micro Packed-Bed Reactor for Chemical Synthesis"; Department of Chemical Engineering, Massachusetts Institute of Technology, International Conference on Microreaction Technology, 2000, pp. 277-285.

Losey et al.; "Microfabricated Devices for Multiphase Catalytic Processes"; Department of Chemical Engineering, Massachusetts Institute of Technology, International Conference on Microreaction Technology, 2000, pp. 416-422.

Losey et al.; "Microfabricated Multiphase Packed-Bed Reactors: Characterization of Mass Transfer and Reactions"; *Ind. Eng. Chem. Res.* 2001, 40, pp. 2555-2562.

Lowe et al.; "Micromixing Technology"; International Conference on Microreaction Technology, 2000, pp. 31-48.

McGovern et al.; "Catalyst-Trap Microreactor for Hydrogentaiton of a Pharmaceutical Intermediate"; Stevens Institute of Technology.

Meille et al.; "Gas/Liquid Mass Transfer in Small Laboratory Batch Reactors: Comparison of Methods"; *Ind. Eng. Chem. Res.* 2004, 43, pp. 924-927.

Pestre et al.; "Effect of gas-liquid mass transfer on enantioselectivity in asymmetric hydrogenations"; *Journal of Molecular Catalysis A: Chemical* 252 (2006), pp. 85-89.

Roy et al.; "Design of monolithic catalysts for multiphase reactions"; *Chemical Engineering Science* 59 (2004), pp. 957-966.

Roy et al.; "Monoliths as Multiphase Reactors: A Review"; *AIChE Journal*, Nov. 2004, vol. 50, No. 11, pp. 2918-2938.

Yeong et al.; "Catalyst preparation and deactiviation issues for nitrobenzene hydrogenation in a microstructured falling film reactor"; *Catalysis Today* 81 (2003), pp. 641-651.

Yeong et al.; "Experimental studies of nitrobenzene hydrogenation in a microstructured falling film reactor"; *Chemical Engineering Science* 59 (2004), pp. 3491-3493.

Utada et al.; "Monodisperse Double Emulsions Generated from a Microcapillary Device"; *Science*, vol. 308, Apr. 22, 2005.

Chen et al.; "Performance analysis of a folding flow micromixer"; Microfluid Nanofluid (2009) 6:763-774.

MacInnes et al.; "Investigation of alternating-flow mixing in microchannels"; Chemical Engineering Science 60; 2005; pp. 3453-3467.

MacInnes et al.; "Numerial characterization of floding flow microchannel mixers"; Chemical Engineering Science 62; 2007; pp. 2718-2727.

MacInnes et al.; "Mixing Strategies for Flow in Microchannel Devices"; Chemical and Process Engineering, University of Sheffield, Nov. 24, 2004.

* cited by examiner

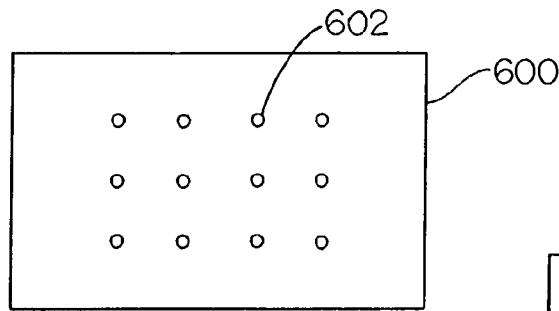
FIG. 16
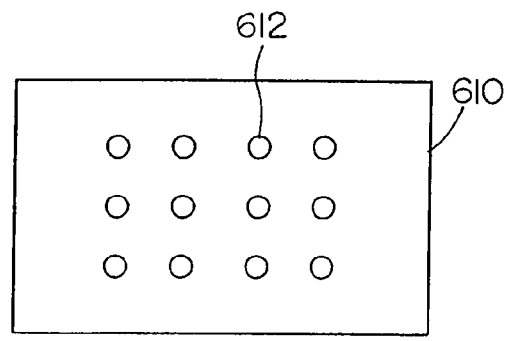
FIG. 17
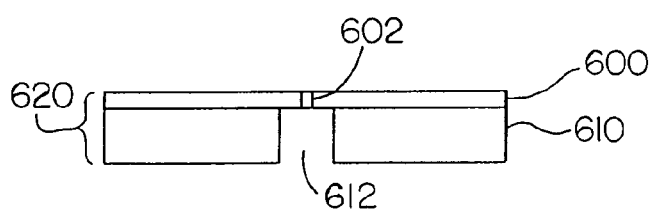
FIG. 18
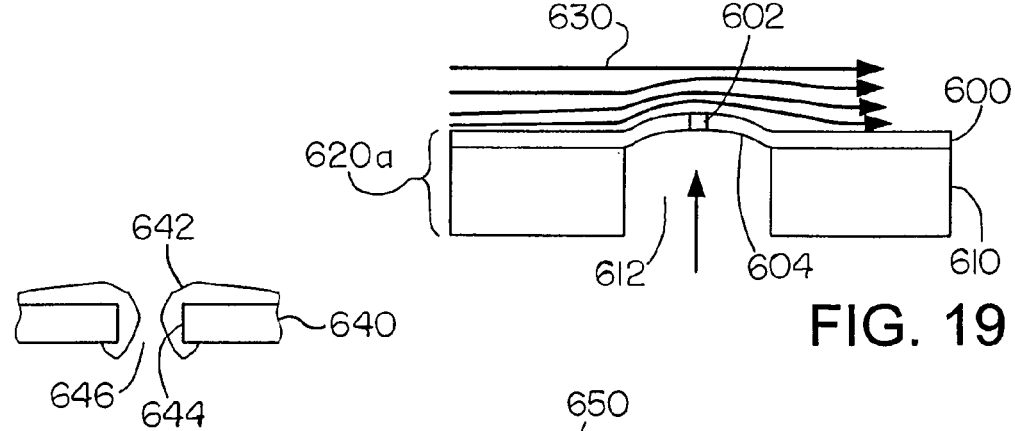
FIG. 19
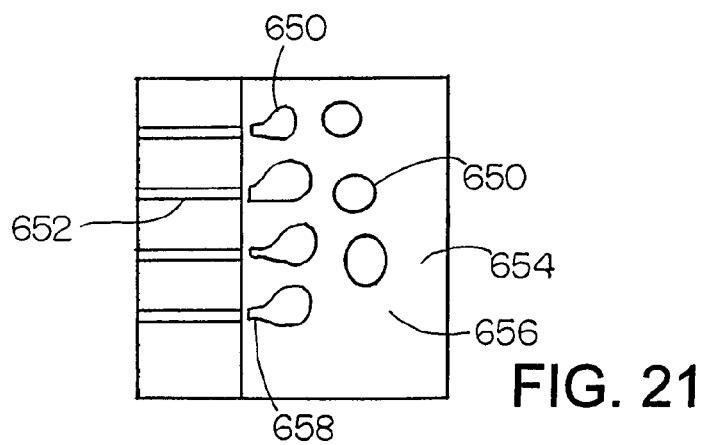
FIG. 20
FIG. 21

US 7,816,411 B2

MULTIPHASE MIXING PROCESS USING MICROCHANNEL PROCESS TECHNOLOGY

This application is a continuation of U.S. application Ser. No. 11/241,813, filed Sep. 30, 2005 (now U.S. Pat. No. 7,622, 509 B2), which is incorporated herein by reference.

TECHNICAL FIELD

This invention relates to a multiphase mixing process using microchannel process technology.

BACKGROUND

The dispersion of gas bubbles in a liquid may be useful for gas-liquid contacting to promote absorption or stripping, with or without chemical reaction, or for foam or froth production. Examples of these include: air sparging to meet BOD (Biological Oxygen Demand) requirements for waste streams; air injection for mixing liquids in a vessel; air sparging to stimulate growth of bacteria for hazardous waste treatment; nitrogen sparging for bulking salad dressings or mustard; $CO_2$ sparging for carbonated beverages and beer; chlorine sparging for bleaching pulp in the manufacture of paper; air sparging for coal flotation and other separations of solids; nitrogen sparging to remove entrained water from motor oil; oxygen or air sparging to enhance cell growth in fermentation reactions; sparging air, oxygen, or other gases into reactors for improved performance; hydrogen sparging for a broad spectrum of chemical hydrogenation reactions; air or natural gas sparging for oil removal from produced water from oil wells; oxygen sparging for bleaching pulp in the manufacture of paper; nitrogen sparging to remove oxygen from edible oils, wine and juices; oxygen sparging in fish farming for stimulation of fish growth; oxone sparging to sanitize ultrapure water systems in pharmaceutical plants; $CO_2$ or $NH_3$ sparging to adjust pH in waste or process streams; direct steam injection for efficient heating, and to eliminate steam hammer; air sparging for removal of VOC (Volatile Organic Compounds) from waste streams; and the like. A problem with many of these operations is that the dispersion of the gas is inefficient.

SUMMARY

The present invention provides a solution to this problem. In one embodiment, the present invention provides for the dispersion of relatively small gas bubbles with relatively high surface areas into a liquid. This results in a relatively high gas/liquid contact area. The smaller bubbles and higher surface areas may dissolve the gases more efficiently in the liquids. This can provide for a reduction in gas consumption. This can also reduce the time required to dissolve the gas into the liquid, resulting in faster processing and higher productivity.

This invention relates to a process for making a multiphase mixture, comprising: flowing a first fluid stream in a process microchannel, the first fluid stream comprising at least one liquid and/or at least one gas, the process microchannel having an apertured section; flowing a second fluid stream through the apertured section into the process microchannel in contact with the first fluid stream to form the multiphase mixture, the second fluid stream comprising at least one gas and/or at least one microbody-forming material, the first fluid stream forming a continuous phase in the multiphase mixture, the second fluid stream forming a discontinuous phase dispersed in the continuous phase.

In one embodiment, the second fluid dissolves in the first fluid. This may occur in the process microchannel or after the multiphase mixture exits the process microchannel. An advantage of the inventive process, in at least one embodiment, is that the second fluid in the multiphase mixture may comprise relatively small gas bubbles which dissolve more efficiently in the first fluid as compared to larger gas bubbles formed by conventional techniques not using microchannel process technology.

In one embodiment, the multiphase mixture further comprises solid particles dispersed in the first fluid stream.

In one embodiment, heat is exchanged between the process microchannel and a heat source and/or heat sink. In one embodiment, the heat source and/or heat sink comprises at least one heat exchange channel.

In one embodiment, the apertured section extends along at least part of the axial length of the process microchannel. In one embodiment, the apertured section extends along at least about 10% of the axial length of the process microchannel, and in one embodiment at least about 20% of the axial length of the process microchannel, and in one embodiment at least about 35% of the axial length of the process microchannel, and in one embodiment at least about 50% of the axial length of the process microchannel, and in one embodiment at least about 65% of the axial length of the process microchannel, and in one embodiment at least about 80% of the axial length of the process microchannel, and in one embodiment at least about 95% of the axial length of the process microchannel.

In one embodiment, the second fluid stream flows from a second fluid stream channel through the apertured section.

In one embodiment, heat is exchanged between the process microchannel and a heat source and/or heat sink, the second fluid stream channel and a heat source and/or heat sink, or both the process microchannel and the second fluid stream channel and a heat source and/or heat sink. The heat source and/or heat sink may be used for heating, cooling, or both cooling and heating. The heat source may comprise a heat exchange channel and/or a heating element. The heat sink may comprise a heat exchange channel and/or a cooling element. In one embodiment, the heat source and/or heat sink may be adjacent to the process microchannel, the second fluid stream channel, or both the process microchannel and the second fluid stream channel. In one embodiment, the heat source and/or heat sink may be remote from the process microchannel and/or second fluid stream channel, but sufficiently close to the process microchannel and/or second fluid stream channel to transfer heat to or from the process microchannel and/or second fluid stream channel.

In one embodiment, the process is conducted in a multiphase mixer wherein one or more headers or manifolds are employed to provide for the flow of fluid into the process microchannels, second fluid stream channels and heat exchange channels, and one or more footers or manifolds are employed to provide for the flow of fluid out of the process microchannels and heat exchange channels.

In one embodiment, the first fluid stream and the second fluid stream contact each other in a mixing zone in the process microchannel. In one embodiment, heat is exchanged between a heat source and/or heat sink and at least part of the process microchannel in the mixing zone. In one embodiment, heat is exchanged between a heat source and/or heat sink and at least part of the process microchannel upstream of the mixing zone. In one embodiment, heat is exchanged between a heat source and/or heat sink and at least part of the process microchannel downstream of the mixing zone.

In one embodiment, the process microchannel has a restricted cross section in the mixing zone.

In one embodiment, the process microchannel has walls that are spaced apart and apertured sections in each of the spaced apart walls, the second fluid stream flowing through each of apertured sections into the process microchannel. In one embodiment, the apertured sections in each of the spaced apart walls comprise a plurality of apertures, the apertures in the apertured section of one of the walls being aligned directly opposite the apertures in the apertured section of the other wall. In one embodiment, the apertured sections in each of the spaced apart walls comprise a plurality of apertures, at least some of the apertures in the apertured section of one of the walls being offset from being aligned directly with the apertures in the apertured section of the other wall.

In one embodiment, the process microchannel is in a multiphase mixture forming unit comprising a first process microchannel, a second process microchannel, and a second fluid stream channel positioned between the first process microchannel and the second process microchannel, each process microchannel having a wall with an apertured section, the first fluid stream flowing through the first process microchannel and the second process microchannel, the second fluid stream flowing from the second fluid stream channel through the apertured section in the first process microchannel in contact with the first fluid stream and through the apertured section in the second process microchannel in contact with the first fluid stream.

In one embodiment, a third fluid stream flows in a third fluid stream channel, the third fluid stream channel having another wall with another apertured section, the process further comprising: flowing the second fluid stream through the another apertured section in contact with the third fluid stream to form another multiphase mixture; and flowing the another multiphase mixture through the apertured section into the process microchannel in contact with the first fluid stream.

In one embodiment, the process microchannel is formed from parallel spaced sheets and/or plates. In one embodiment, the second fluid stream channel is formed from parallel spaced sheets and/or plates, and the second fluid stream channel is adjacent to the process microchannel. In one embodiment, the heat exchange channel is formed from parallel spaced sheets and/or plates, and the heat exchange channel is adjacent to the process microchannel, the second fluid stream channel, or both the process microchannel and the second fluid stream channel.

In one embodiment, the process is conducted in a microchannel mixer, the microchannel mixer comprising a plurality of the process microchannels and second fluid stream channels, each process microchannel having a wall with an apertured section and an adjacent second fluid stream channel, the second fluid stream flowing from the second fluid stream channel through the apertured section into the process microchannel in contact with the first fluid stream, the process microchannels and second fluid stream channels being formed from parallel spaced sheets and/or plates, the process microchannels and second fluid stream channels being adjacent to each other and aligned in interleaved side-by-side planes or interleaved planes stacked one above another.

In one embodiment, the process microchannel comprises two or more apertured sections and separate second fluid streams flow through each of the apertured sections. In one embodiment, the separate second fluid streams flowing through each of the apertured sections have different compositions. In one embodiment the separate second fluid streams flowing through each of the apertured sections have different properties.

In one embodiment, the process is conducted in a microchannel mixer, the microchannel mixer comprising at least two of the process microchannels, and in one embodiment at least about 10 of the process microchannels, and in one embodiment at least about 100 of the process microchannels, and in one embodiment at least about 1000 of the process microchannels.

In one embodiment, the process is conducted in a microchannel mixer, the microchannel mixer comprising a plurality of the process microchannels connected to at least one first fluid stream manifold, the first fluid stream flowing through the at least one first fluid stream manifold to the process microchannels. In one embodiment, second fluid stream channels are adjacent to the process microchannels, and the microchannel mixer further comprises at least one second fluid stream manifold connected to the second fluid stream channels, the second fluid stream flowing through the at least one second fluid stream manifold to the second fluid stream channels. In one embodiment, heat exchange channels are adjacent to the process microchannels and/or second fluid stream channels, the microchannel mixer further comprising at least one heat exchange manifold connected to the heat exchange channels, and a heat exchange fluid flows through the at least one heat exchange manifold to the heat exchange channels.

In one embodiment, the second fluid stream flows from a second fluid stream channel through the apertured section into the process microchannel, the process microchannel and the liquid channel comprising circular tubes aligned concentrically.

In one embodiment, the process is conducted in a microchannel mixer, the microchannel mixer comprising a plurality of the process microchannels wherein separate multiphase mixtures are formed in each of the process microchannels, the multiphase mixtures formed in at least two of the process microchannels being different from each other. These multiphase mixtures can have different compositions and/or different properties. This microchannel mixer may be referred to as a combinatorial synthesis and screening device. An advantage of this embodiment of the invention is that it provides for the forming and evaluating of multiple product multiphase mixtures at the same time using the same apparatus. This can be advantageous when it is desired to screen multiple formulations as potential new products.

In one embodiment, the process is conducted in a microchannel mixer, the microchannel mixer comprising a plurality of multiphase mixture forming units aligned side-by-side or stacked one above another, each multiphase mixture forming unit comprising a process microchannel and an adjacent second fluid stream channel, the process microchannel and adjacent second fluid stream channel having a common wall with an apertured section in the common wall, the apertured section being suitable for flowing a second fluid stream from the second fluid stream channel through the apertured section into the process microchannel, each process microchannel and second fluid stream channel being formed from parallel spaced sheets, plates, or a combination of such sheets and plates, the process comprising: flowing a first fluid stream in the process microchannel; flowing a second fluid stream from the second fluid stream channel through the apertured section into the process microchannel; and mixing the first fluid stream and the second fluid stream in the process microchannel to form the multiphase mixture.

In one embodiment, the inventive process may be operated with a relatively low pressure drop for the flow of the first fluid stream through the process microchannel. In one embodiment, the inventive process may be operated with a relatively low pressure drop for the flow of the second fluid stream through the apertured section into the process microchannel.

In one embodiment, mixing within the process microchannel may be improved by the use of surface features formed on one or more interior walls of the process microchannel. In one embodiment, the second fluid may contact the first fluid within the process microchannel and then flow through a region within the process microchannel wherein surface features are formed on one, two or more of the interior walls of the process microchannel. The surface features may be in the form of depressions in and/or projections from one or more of the microchannel interior walls that are oriented at an oblique angle relative to the direction of flow of fluid through the process microchannel. The angled features may be aligned toward the direction of flow or against the direction of flow. The surface features may be aligned at an angle (for example, from about 1° to about 89°, and in one embodiment from about 30° to about 75° relative to the direction of flow. The flow of a fluid stream in contact with the surface features may force part of the fluid stream into depressions or the surface features while part of the fluid stream continues to flow above the surface features. Flow within the surface features may conform with the surface feature and be at an angle to the bulk flow. As the fluid exits the surface feature it may exert momentum in the x and y direction for an x, y, z coordinate system wherein the bulk fluid flows in the z direction. The effect may be a churning or rotation of the fluid flow. This pattern may be especially helpful for mixing a two-phase flow as the imparted velocity gradients may create fluid shear that breaks up the second fluid into small and well dispersed gas bubbles or particulates.

In one embodiment, surface feature regions within the process microchannel may be placed in series such that mixing of the first fluid and second fluid may be accomplished using a first surface feature region followed by at least one second surface feature region that creates a different flow pattern. The second flow pattern may be used to disengage or separate the first fluid and second fluid. This step may be used to assist gas or liquid recovery. This embodiment of the invention may be especially helpful for gas liquid reactions, where a gas may be introduced into a liquid, and then the resulting mixture flows through a first surface feature region that contains a heterogeneous catalyst or homogeneous catalyst or no catalyst. The mixture may then optionally flow through a second surface feature region where a flow pattern that creates centrifugal force to drive the liquid toward the interior walls of the process microchannel in an annular flow pattern while gas stays in the fluid core. This latter profile may assist with disengaging or separating unreacted gas from a reactant mixture. One pattern of surface features that may create a strong central vortex in the fluid may be a pair of angled slots on the top and bottom of the process microchannel. A central swirling flow pattern may be created. In one embodiment, a bubbly mixture may shed the liquid toward the walls of the process microchannel and force the gas to the center of the process microchannel.

In one embodiment, the apertured section may comprise an interior portion that forms part of one or more of the interior walls of the process microchannel. A surface feature sheet may overlie this interior portion of the apertured section. Surface features may be formed in and/or on the surface feature sheet. The second fluid may flow through the apertured section and the surface feature sheet. The influx of fluid through the apertured section may be detached from the surface of the surface feature sheet while within the surface features of the surface feature sheet. The surface feature sheet may contain angled features that have a relatively small width or span relative to the overall flow length. The surface feature sheet may provide mechanical support for the apertured section. In addition, the flow vorticity or angled flow created by the surface features may be preferential in further imparting shear to the second fluid flowing through the apertured section and thus reduce the size of the second fluid particles or bubbles in the bulk flow path.

In one embodiment, the multiphase mixture may comprise a liquid-solid stream or a gas-liquid-solid stream. The second fluid stream may comprise a dispersion of solids in either a gas or liquid. The first fluid stream may comprise a gas, a liquid, or solids dispersed in gas or a liquid. Flow of the multiphase mixture through a surface feature section in the process microchannel may be advantageous as imparted non-flow direction momentum may act to keep the mixture well mixed or dispersed. This application may be useful for a dispersion of a solid catalyst within a liquid reactant.

In one embodiment, the multiphase mixture may comprise solid particles dispersed in the first and/or second fluid stream and is in the form of a fluidized bed, the process microchannel comprising surface features formed in and/or on one or more of its interior walls for modifying flow within the process microchannel. This may involve mixing a gaseous stream into a solid-particulate containing fluid stream. The solids may be blown into or picked up by a carrier fluid. The surface features may enhance the mixing of the multiphase mixture.

In one embodiment, solids may form in the multiphase mixture as a result of chemical reaction and/or precipitation.

In one embodiment, the multiphase mixture is in the form of a foam. In one embodiment, the multiphase mixture may optionally contain one or more surfactants. These may be included to form a foam, although the presence of a surfactant is not required for some foams.

BRIEF DESCRIPTION OF THE DRAWINGS

In the annexed drawings, like parts and features have like references.

FIG. 16 is a plan view of an apertured sheet which is useful in making the apertured section of the process microchannel used with the inventive process.

FIG. 17 is a plan view of an apertured sheet or plate which is useful in making the apertured section of the process microchannel used with the inventive process.

FIG. 18 is an illustration of a relatively thin apertured sheet overlying a relatively thick apertured sheet or plate which is useful in making the apertured section of the process microchannel used with the inventive process.

FIG. 19 is illustrative of a relatively thin apertured sheet overlying a relatively thick apertured sheet or plate which is useful in making the apertured section of the process microchannel used with the inventive process.

FIG. 20 is illustrative of an alternate embodiment of an aperture that may be used in the apertured section of the process microchannel used with the inventive process, the aperture having a coating partially filling it and overlying its sidewalls.

FIG. 21 is a schematic illustration showing the formation of gas bubbles or microbodies during the operation of the inventive process.

DETAILED DESCRIPTION

Figure 1:
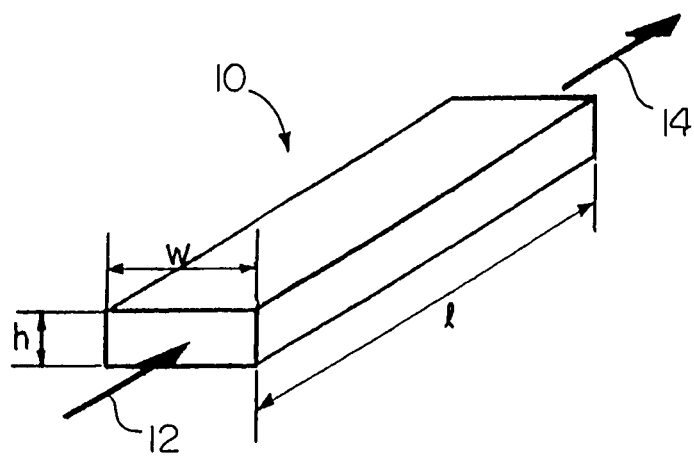
FIG. 1 is a schematic illustration of a microchannel that may be useful in the inventive process.

The term "microchannel" refers to a channel having at least one internal dimension of height or width of up to about 10 millimeters (mm), and in one embodiment up to about 5 mm, and in one embodiment up to about 2 mm, and in one embodiment up to about 1 mm. The flow of fluid through the microchannel may proceed along the length of the microchannel normal to the height and width of the microchannel. An example of a microchannel that may be used with the inventive process as a process microchannel, and optionally second fluid stream channel, third fluid stream channel and/or a heat exchange channel is illustrated in FIG. 1. The microchannel 10 illustrated in FIG. 1 has a height (h), width (w) and axial length (l). Fluid flows through the microchannel 10 along the length of the microchannel in the direction indicated by arrows 12 and 14. The height (h) or width (w) of the microchannel may be in the range of about 0.05 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.75 mm, and in one embodiment about 0.05 to about 0.5 mm. The other dimension of height or width may be of any dimension, for example, up to about 3 meters, and in one embodiment about 0.01 to about 3 meters, and in one embodiment about 0.1 to about 3 meters. The axial length (l) of the microchannel may be of any dimension, for example, up to about 10 meters, and in one embodiment about 0.1 to about 10 meters, and in one embodiment from about 0.2 to about 6 meters, and in one embodiment from 0.2 to about 3 meters. Although the microchannel 10 illustrated in FIG. 1 has a cross section that is rectangular, it is to be understood that the microchannel may have a cross section having any shape, for example, a square, circle, semi-circle, trapezoid, etc. The shape and/or size of the cross section of the microchannel may vary over its length. For example, the height or width may taper from a relatively large dimension to a relatively small dimension, or vice versa, over the length of the microchannel.

The term "adjacent" when referring to the position of one channel relative to the position of another channel means directly adjacent such that a wall separates the two channels. This wall may vary in thickness. However, "adjacent" channels are not separated by an intervening channel that would interfere with heat transfer between the channels.

The term "surface feature" refers to a depression in a microchannel wall and/or a projection from a microchannel wall that modifies flow within the microchannel. The surface features may be in the form of circles, oblongs, squares, rectangles, checks, chevrons, wavy shapes, and the like. The surface features may contain sub features where the major walls of the surface features further contain smaller surface features that may take the form of notches, waves, indents, holes, burrs, checks, scallops, and the like. The surface features have a depth, a width, and for non-circular surface features a length. Examples are illustrated in FIGS. 22-26. The surface features may be formed on or in one or more of the interior side walls of the process microchannels used in the inventive process. The surface features may be formed on or in one or more of the interior side walls of the second fluid stream channels and/or heat exchange channels used in the inventive process. The surface features may be referred to as passive surface features or passive mixing features.

The terms "upstream" and "downstream" refer to positions within the channels, including microchannels, used in the inventive process that are relative to the direction of flow of fluid through the channels. For example, a position within a channel not yet reached by a portion of a fluid flowing through that channel toward that position would be downstream of that portion of the fluid. A position within a channel already passed by a portion of the fluid flowing through that channel away from that position would be upstream of that portion of the fluid. The terms "upstream" and "downstream" do not necessarily refer to a vertical position since the channels used in the inventive process may be oriented horizontally, vertically, or at an inclined angle.

The term "microbody" refers to a three-dimensional body having a mean dimension (e.g., diameter, height, width, length) in the range up to about 200 microns, and in one embodiment from about 0.01 to about 200 microns, and in one embodiment about 0.01 to about 100 microns, and in one embodiment about 0.01 to about 50 microns, and in one embodiment about 0.01 to about 25 microns, and in one embodiment about 0.01 to about 10 microns, and in one embodiment about 0.01 to about 5 microns, and in one embodiment about 0.01 to about 2 microns, and in one embodiment about 0.01 to about 1 micron, and in one embodiment about 0.01 to about 0.5 micron, and in one embodiment about 0.01 to about 0.2 micron, and in one embodiment about 0.01 to about 0.1 micron, and in one embodiment about 0.01 to about 0.08 micron, and in one embodiment about 0.01 to about 0.05 micron, and in one embodiment about 0.01 to about 0.03 micron. These microbodies include bodies having cross-sections in the form of circles and/or ellipses. The microbodies may be in the form of spheres, ellipsoids, ovoids, and the like. The microbodies may have needle-like shapes. The microbodies may be hollow or solid. The microbodies may be microspheres. The microbodies may have a major dimension (e.g., diameter, length) and a minor dimension (e.g., diameter, height, width), the ratio of the major dimension to the minor dimension being in the range from about 10:1 to about 1:1, and in one embodiment from about 5:1 to about 1:1, and in one embodiment from about 2:1 to about 1:1.

The term "fluid" refers to a gas, a liquid, a gas or a liquid containing dispersed solids, a gas containing liquid droplets, a liquid containing gas bubbles, a gas containing liquid droplets and dispersed solids, or a liquid containing gas bubbles and dispersed solids, and the like.

The term "heat source" refers to a substance or device that gives off heat and may be used to heat another substance or device. The heat source may be in the form of a heat exchange channel having a heat exchange fluid in it that transfers heat to another substance or device; the another substance or device being, for example, a channel that is adjacent to or sufficiently near the heat exchange channel to receive heat transferred from the heat exchange channel. The heat exchange fluid may be contained in the heat exchange channel and/or it may flow through the heat exchange channel. The heat source may be in the form of a heating element, for example, an electric heating element or a resistance heater. The term "heat sink" refers to a substance or device that absorbs heat and may be used to cool another substance or device. The heat sink may be in the form of a heat exchange channel having a heat exchange fluid in it that receives heat transferred from another substance or device; the another substance or device being, for example, a channel that is adjacent to or sufficiently near the heat exchange channel to transfer heat to the heat exchange channel. The heat exchange fluid may be contained in the heat exchange channel and/or it may flow through the heat exchange channel. The heat sink may be in the form of a cooling element, for example, a non-fluid cooling element.

The term "heat source and/or heat sink" refers to a substance or a device that may give off heat or absorb heat. The heat source and/or heat sink may be in the form of a heat exchange channel having a heat exchange fluid in it that transfers heat to another substance or device adjacent to or near the heat exchange channel when the another substance or device is to be heated, or receives heat transferred from the another substance or device adjacent to or near the heat exchange channel when the another substance or device is to be cooled. The heat exchange channel functioning as a heat source and/or heat sink may function as a heating channel at times and a cooling channel at other times. A part or parts of the heat exchange channel may function as a heating channel while another part or parts of the heat exchange channel may function as a cooling channel.

The term "heat exchange channel" refers to a channel having a heat exchange fluid in it that may give off heat and/or absorb heat.

The term "heat exchange fluid" refers to a fluid that may give off heat and/or absorb heat.

Figure 2:
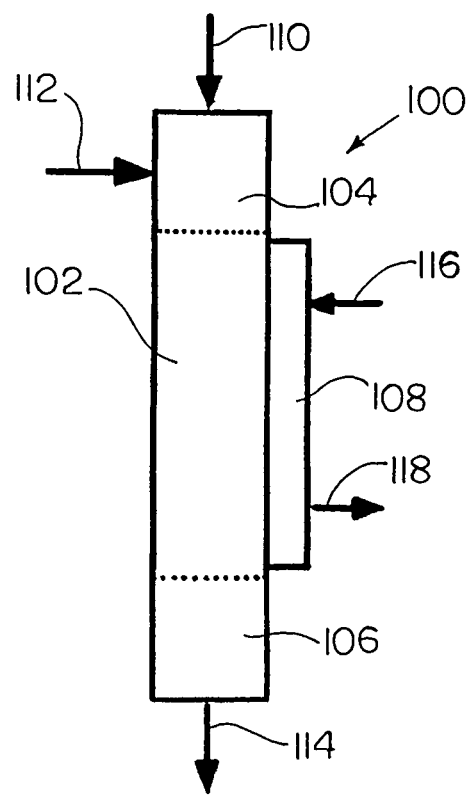
FIG. 2 is a flow sheet illustrating the inventive process in a particular form wherein a microchannel mixer is used to form a multiphase mixture.

Referring to FIG. 2, the process may be conducted using microchannel mixer 100 which includes microchannel mixer core 102, process fluid header 104, product footer 106, and heat exchange manifold 108. The microchannel mixer core 102 contains a plurality of process microchannels, adjacent second fluid stream channels, and heat exchange channels. The second fluid stream channels and/or heat exchange channels may be microchannels. The process microchannels, second fluid stream channels and heat exchange channels may be aligned in layers, one above the other, or side by side. The process header 104 provides a passageway for the first fluid stream to flow into the process microchannels and the second fluid stream to flow into the second fluid stream channels with an even or substantially even distribution of flow to the channels. The product footer 106 provides a passageway for the multiphase mixture product to flow from the process microchannels in a rapid manner with a relatively high rate of flow. The first fluid stream flows into the microchannel mixer 100 through the header 104, as indicated by arrow 110. The second fluid stream flows into the microchannel mixer 100 through the header 104, as indicated by arrow 112. The first fluid stream and the second fluid stream flow into the microchannel mixer core 102 and are mixed to form the multiphase mixture. The multiphase mixture flows from the microchannel mixing core 102 through the product footer 106, and out of product footer 106, as indicated by arrow 114. In one embodiment, the multiphase mixture may be recycled back through the microchannel mixer core 102 any number of times, for example, one, two, three, four times, etc. A heat exchange fluid flows into heat exchange manifold 108, as indicated by arrow 116, and from heat exchange manifold 108 through the heat exchange channels in the microchannel mixer core 102 and then back to the heat exchange manifold 108, and out of heat exchange manifold 108, as indicated by arrow 118. The microchannel mixer 100 may be employed in conjunction with storage vessels, pumps, valves, flow control devices, and the like, which are not shown in the drawings, but would be apparent to those skilled in the art.

Figure 3:
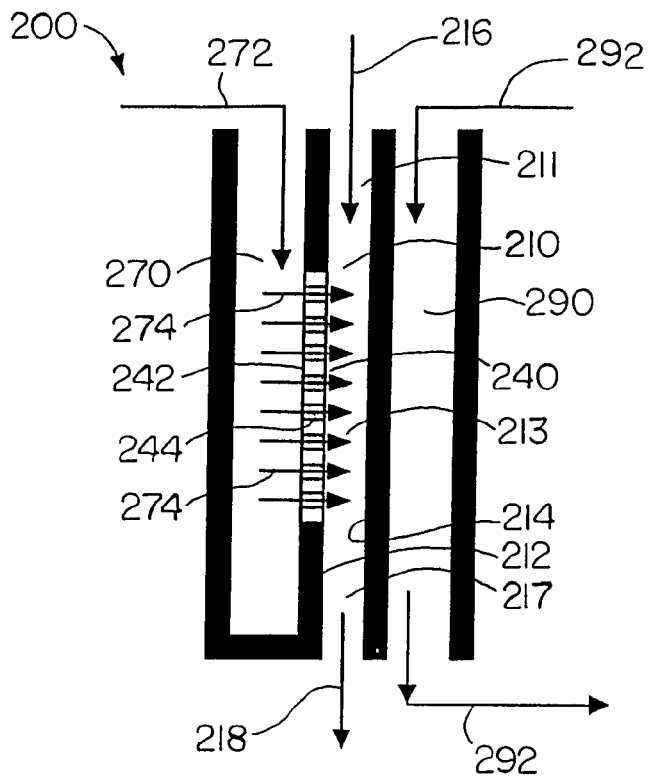
FIG. 3 is a flow sheet illustrating a multiphase mixture forming unit for use with the inventive process wherein a first fluid stream flows through a process microchannel and is mixed with a second fluid stream that flows into the process microchannel from an adjacent second fluid stream channel through an apertured section in the process microchannel.

The microchannel mixer core may comprise a plurality of multiphase mixture forming units. Useful embodiments of the multiphase mixture forming units are illustrated in FIGS. 3-9 and 12. Referring to FIG. 3, the inventive process may be conducted using multiphase mixture forming unit 200 which comprises process microchannel 210 which has opposite sidewalls 212 and 214, and an apertured section 240 in sidewall 212. The apertured section 240 may be referred to as a porous section or porous substrate. The apertured section 240 may comprise a sheet or plate 242 having an array of apertures 244 extending through it. Adjacent to the sidewall 212 is second fluid stream 270 which opens to process microchannel 210 through the apertures 244 in the apertured section 240. The process microchannel 210 has non-apertured or non-porous regions 211 and 217, and mixing zone 213. The non-apertured region 211 extends from the entrance to the process microchannel to the entrance to the mixing zone 313. The non-apertured region 211 is upstream of the mixing zone 213. The mixing zone 213 is next to the apertured section 240. The non-apertured region 217 extends from the end of mixing zone 213 to the exit of the process microchannel 210. The non-apertured region 217 is downstream of the mixing zone 213. Adjacent to sidewall 214 is heat exchange channel 290. In operation, a first fluid stream flows into process microchannel 210, as indicated by arrow 216, and through the non-apertured region 211 into the mixing zone 213. A second fluid stream flows into second fluid stream channel 270, as indicated by arrow 272, and then flows through apertured section 240, as indicated by arrows 274, into the mixing zone 213. In mixing zone 213, the second fluid stream contacts and mixes with the first fluid stream to form a multiphase mixture. The second fluid stream may form a discontinuous phase within the first fluid stream. The first fluid stream may form a continuous phase. The multiphase mixture flows from the mixing zone 213 through the non-apertured region 217 and out of the process microchannel 210, as indicated by arrow 218. Heating or cooling may be optional. When heating or cooling is desired, heat exchange fluid flows through the heat exchange channel 290, as indicated by arrows 292, and heats or cools the fluids in the process microchannel 210 and second fluid stream channel 270. The degree of heating or cooling may vary over the length of the process microchannel 210 and second fluid stream channel 270. The heating or cooling may be negligible or non-existent in some sections of the process microchannel and second fluid stream channel, and moderate or relatively high in other sections. Alternatively, the heating or cooling can be effected using other than a heat exchange channel. For example, heating can be effected using an electric heating element or resistance heater. The electric heating element or resistance heater can be used to form one or more walls of the process microchannel 210 and/or second fluid stream channel 270. The electric heating element or resistance heater can be in one or more walls of the process microchannel 210 and/or second fluid stream channel 270. Cooling can be effected using a non-fluid cooling element. Multiple heating or cooling zones may be employed along the length of the process microchannel 210. Similarly, heat exchange fluids at different temperatures in one or more heat exchange channels may be employed along the length of the process microchannel 210 and/or second fluid stream channel 270.

Figure 4:
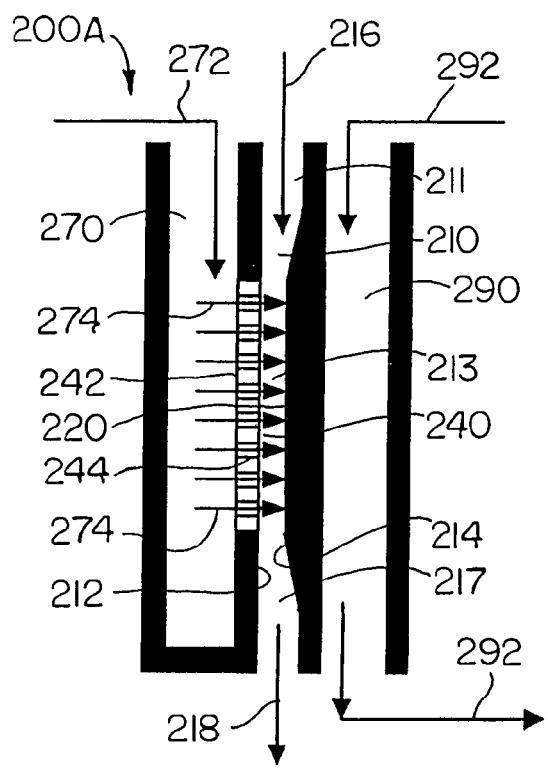
FIGS. 4-9 are flow sheets illustrating multiphase mixture forming units for use with the inventive process.

The multiphase mixture forming unit 200A illustrated in FIG. 4 is identical to the multiphase mixture forming unit 200 illustrated in FIG. 3 with the exception that the sidewall 210 of process microchannel 210 includes tapered section 220 which is aligned opposite apertured section 240. Tapered section 220 reduces the width or height of the process microchannel 210 in the mixing zone 213, and thus provides a restricted cross section for the process microchannel 210 in the mixing zone 213. The width or height may be in the range from about 0.001 to about 5 mm, and in one embodiment from about 0.01 to about 2 mm. The presence of tapered section 220 provides for an increase in the velocity of the fluid flowing through the mixing zone 213. The increased velocity of the fluid flowing through the mixing zone 213 results in an increased shear force acting on the second fluid stream flowing through apertures 244 into the mixing zone 213. This facilitates the flow of the second fluid stream through the apertures 244. The velocity of fluid flowing through the restricted cross section of the process microchannel 210 through the mixing zone 213 may be in the range from about 0.005 to about 100 meters per second (m/s), and in one embodiment from about 0.01 to about 50 m/s.

Figure 5:
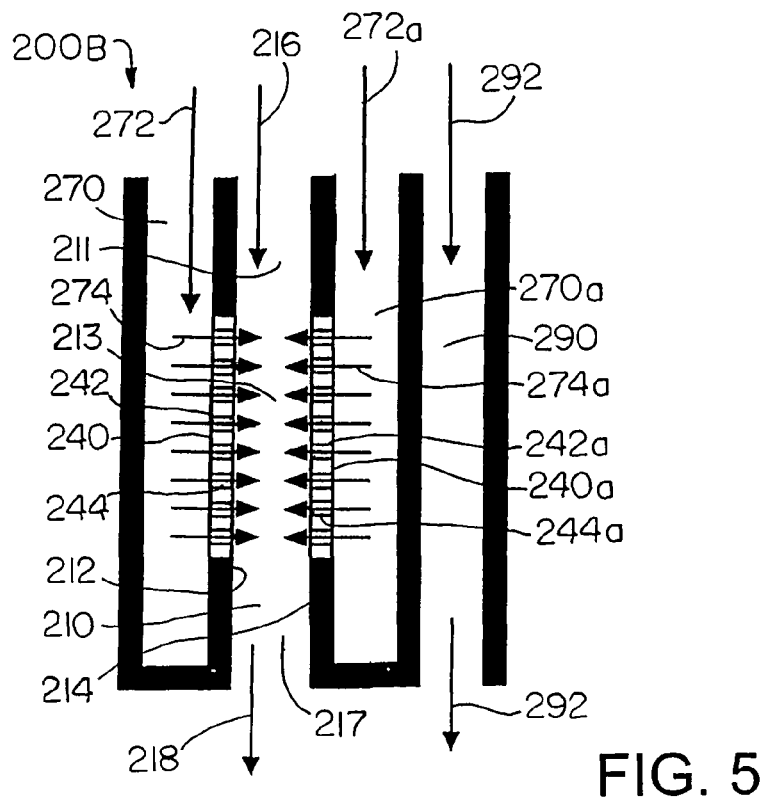

The multiphase mixture forming unit 200B illustrated in FIG. 5 is similar to the multiphase mixture forming unit 200 illustrated in FIG. 3 with the exception that the multiphase mixture forming unit 200B also includes second fluid stream channel 270a and apertured section 240a. Second fluid stream channel 270a is positioned between process microchannel 210 and heat exchange channel 290. Apertured section 240a is formed in sidewall 214. Second fluid stream channel 270a opens to process microchannel 210 through apertured section 240a. The apertured section 240a may comprise a sheet or plate 242a having an array of apertures 244a extending through it. The process microchannel 210 has non-apertured or non-porous region 211 and 217, and a mixing zone 213. The non-apertured region 211 extends from the entrance to the process microchannel to the entrance to the mixing zone 213 and is upstream from the mixing zone 213. The mixing zone 213 is positioned between the apertured sections 240 and 240a. The non-apertured region 217 extends from the end of mixing zone 213 to the exit of the process microchannel 210. The non-apertured region 217 is downstream of the mixing zone 213. In operation, a first liquid stream flows into process microchannel 210, as indicated by arrow 216, and through the non-apertured region 211 into the mixing zone 213. A second fluid stream flows into second fluid stream channels 270 and 270a as indicated by arrows 272 and 272a, respectively. The second fluid stream flows through apertured sections 240 and 240a, as indicated by arrows 274 and 274a, respectively, into the mixing zone 213. In mixing zone 213, the second fluid stream contacts and mixes with the first fluid stream to form a multiphase mixture. The second fluid stream may form a discontinuous phase within the first liquid. The first fluid stream may form a continuous phase. The multiphase mixture flows through the non-apertured region 217 and out of the process microchannel 210, as indicated by arrow 218. Heating or cooling may be optional. When heating or cooling is desired, heat exchange fluid flows through heat exchange channel 290, as indicated by directional arrows 292, and heats or cools the fluids in the process microchannel 210 and the second fluid stream channels 270 and 270a. The degree of heating or cooling may vary over the length of the process microchannel and the second fluid stream channels. The heating or cooling may be negligible or non-existent in some sections of the process microchannel and liquid channels, and moderate or relatively high in other sections.

Figure 6:
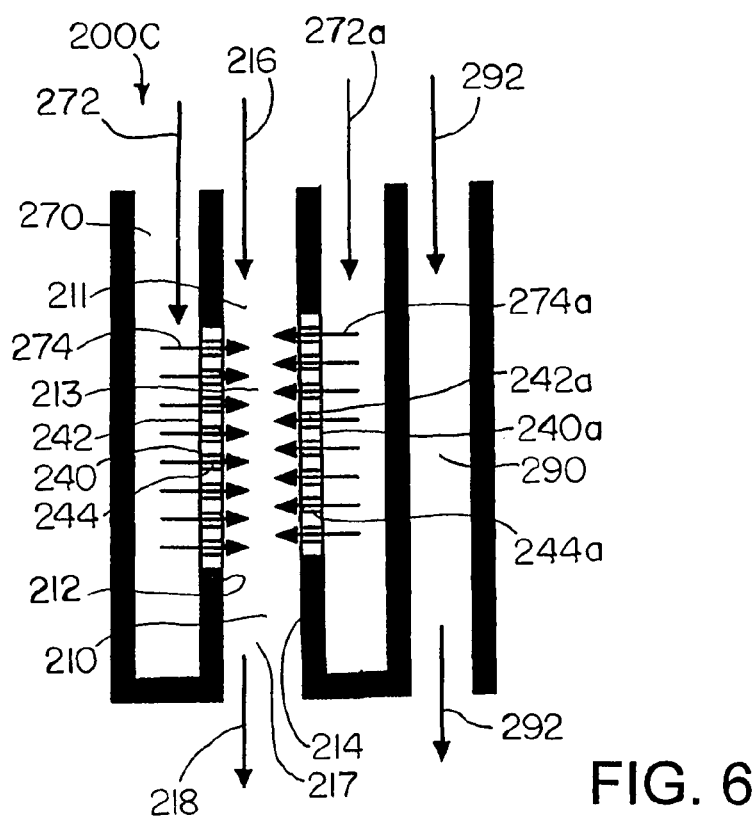

The multiphase mixture forming unit 200C illustrated in FIG. 6 is identical to the multiphase mixture forming unit 200B illustrated in FIG. 5 with the exception that the apertures 244 and 244a illustrated in FIG. 5 are aligned directly opposite each other, while the apertures 244 and 244a illustrated in FIG. 6 are offset from such direct alignment. In FIG. 5 streams of the second fluid stream flowing through the apertures 244 and 244a impinge directly on one another and thereby enhance the diffusion of the second fluid stream into the first fluid stream. On the other hand, in FIG. 6 the streams of the second fluid stream flowing through the apertures 244 and 244a are offset from one another and thereby enhance diffusion by providing a swirling effect within the mixing zone 213.

Figure 7:
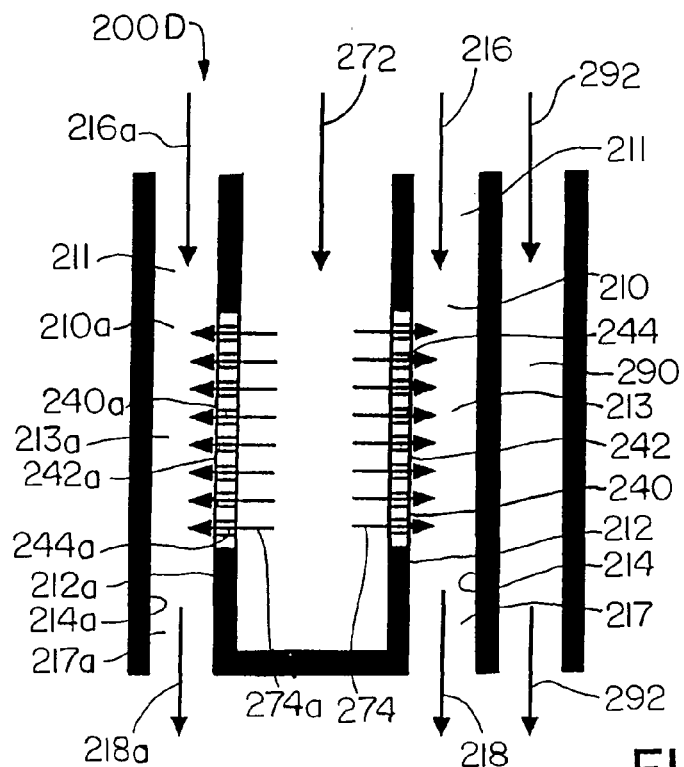

The multiphase mixture forming unit 200D illustrated in FIG. 7 includes process microchannels 210 and 210a, apertured sections 240 and 240a, second fluid stream channel 270, and heat exchange channel 290. Apertured section 240 is formed in sidewall 212, and apertured section 240a is formed in sidewall 212a. The apertured sections 240 and 240a may be referred to as porous sections or porous substrates. Second fluid stream channel 270 opens to process microchannels 210 and 210a through apertured sections 240 and 240a, respectively. The apertured section 240 may comprise a sheet or plate 242 having an array of apertures 244 extending through it. Similarly, the apertured section 240a may comprise a sheet or plate 242a having an array of apertures 244a extending through it. The process microchannels 210 and 210a have non-apertured or non-porous regions 211 and 217, and 211a and 217a, and mixing zones 213 and 213a, respectively. The non-apertured regions 211 and 211a extend from the entrance to the process microchannels 210 and 210a to the entrances to the mixing zones 213 and 213a, respectively. The non-apertured regions 211 and 211a are upstream from the mixing zones 213 and 213a, respectively. The mixing zones 213 and 213a are next to the apertured sections 240 and 240a, respectively. The non-apertured regions 217 and 217a extend from the end of the mixing zones 213 and 213a to the exit of the process microchannels 210 and 210a, respectively. The non-apertured regions 217 and 217a are downstream from the mixing zones 213 and 213a, respectively. Adjacent to the process microchannel 210 is heat exchange channel 290. In operation, a first fluid stream flows into the process microchannels 210 and 210a, as indicated by arrows 216 and 216a, respectively, and through the non-apertured regions 211 and 211a into the mixing zones 213 and 213a. A second fluid stream flows into second fluid stream channel 270, as indicated by arrow 272, and then flows through apertured sections 240 and 240a, as indicated by arrows 274 and 274a, into mixing zones 213 and 213a, respectively. In the mixing zones 213 and 213a, the second fluid stream contacts and mixes with the first fluid stream to form a multiphase mixture. The second fluid stream may form a discontinuous phase within the first fluid stream. The first fluid stream may form a continuous phase. The multiphase mixture flows through non-apertured section 217 and 217a and out of the process microchannels 210 and 210a, as indicated by arrows 218 and 218a, respectively. Heating or cooling may be optional. When heating or cooling is desired, heat exchange fluid flows through the heat exchange channel 290, as indicated by arrows 292, and heats or cools the fluid in the channels 210, 210a and 270. The degree of heating or cooling may vary over the length of the channels. The heating or cooling may be negligible or non-existent in some sections of the process microchannels 210 and 210a and second fluid stream channel 270, and moderate or relatively high in other sections.

Figure 8:
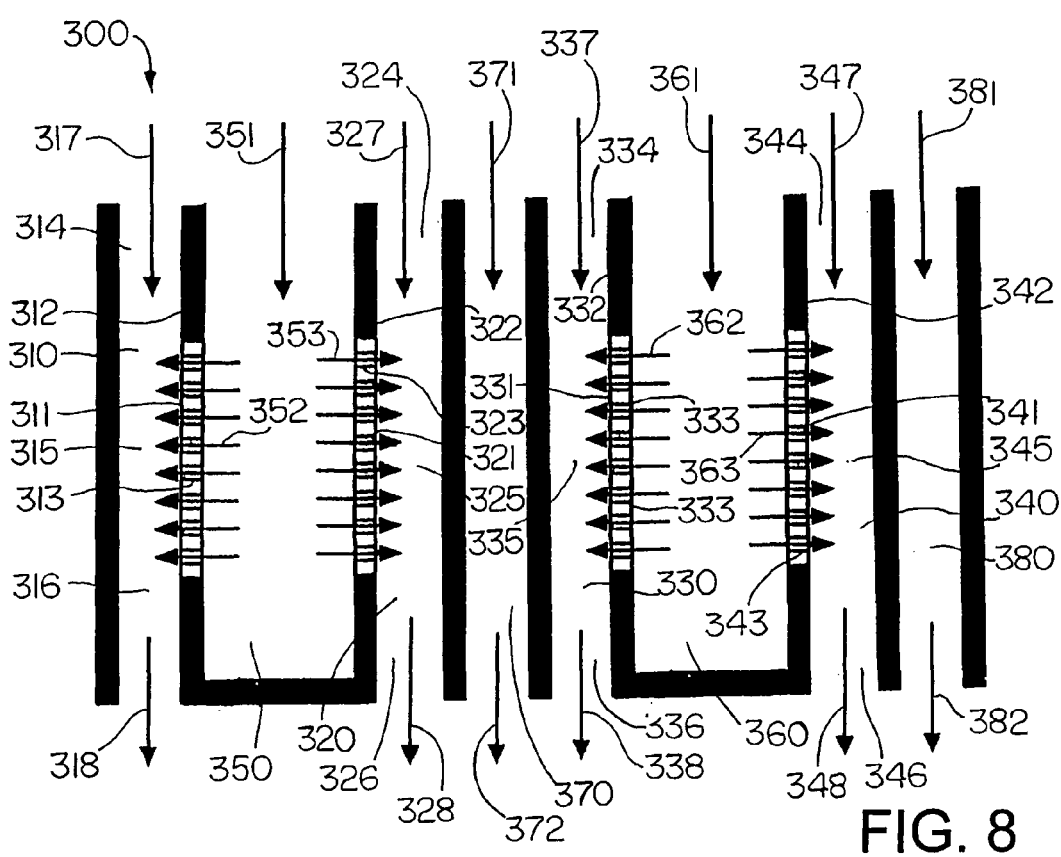

In one embodiment, multiple multiphase mixture formulations and/or sets of processing conditions may be used to generate distinct multiphase mixtures within a single microchannel mixer. For example, a single microchannel mixer may employ two or more process microchannels and associated second fluid stream channels and heat exchange channels to make two, three, four, five, six, seven, eight, nine, ten, tens, hundreds, thousands, tens of thousands, hundreds of thousands, etc. of distinct multiphase mixtures within a single microchannel mixer. This type of mixer can be referred to as a combinatorial-synthesis device. This is shown in FIG. 8 wherein multiphase mixture forming unit 300 is illustrated. Multiphase mixture forming unit 300 employs four process microchannels and as a result may be capable of generating up to four distinct multiphase mixtures. The multiphase mixture forming unit 300 can be repeated any desired number of times, for example, two, three, four, five, six, seven, eight, nine, ten, tens, hundreds, thousands, tens of thousands, etc., to provide for the possibility of the multiple distinct multiphase mixtures indicated above. Multiphase mixture forming unit 300 includes process microchannels 310, 320, 330 and 340, second fluid stream channels 350 and 360, and heat exchange channels 370 and 380. Apertured section 311 is formed in sidewall 312. Apertured section 321 is formed in sidewall 322. Apertured section 331 is formed in sidewall 332. Apertured section 341 is formed in sidewall 342. Apertures 313, 323, 333 and 343 are positioned in and extend through apertured sections 311, 321, 331 and 341, respectively. The process microchannels 310, 320, 330 and 340 include non-apertured section 314, 324, 334 and 344 positioned upstream from mixing sections 315, 325, 335 and 345, respectively. Mixing sections 315, 325, 335 and 345 are positioned next to apertured sections 311, 321, 331 and 341, respectively. The process microchannels 310, 320, 330 and 340 also include non-apertured sections 316, 326, 336 and 346 which are positioned downstream of the mixing zones 315, 325, 335 and 345, respectively. In operation, first fluid streams flow into process microchannels 310, 320, 330 and 340 as indicated by arrows 317, 327, 337 and 347, respectively. The first fluid streams entering process microchannels 310, 320, 330 and 340 may have compositions that are the same as one another or compositions that are different from one another. The first fluid streams flow through the non-apertured sections 314, 324, 334 and 344 into the mixing zones 315, 325, 335 and 345, respectively. The second fluid stream flows into second fluid stream channels 350 and 360, as indicated by arrows 351 and 361. The second fluid stream entering second fluid stream channel 350 may be the same as the second fluid stream entering the second fluid stream channel 360, or it may be different. The difference between the second fluid stream entering second fluid stream channel 350 and the second liquid entering liquid channel 360 may be based on composition or processing conditions, physical properties (e.g., viscosity, density, surface tension, etc.) and/or operating parameters. The second fluid stream entering second fluid stream channel 350, as indicated by arrow 351, flows through the apertured sections 311 and 321, as indicated by arrows 352 and 353, into mixing zones 315 and 325, respectively. In the mixing zones 315 and 325, the second fluid stream contacts and mixes with the first fluid stream to form a multiphase mixture. Similarly, a second fluid stream flows into second fluid stream channel 360, as indicated by arrow 361, and then flows through apertured sections 331 and 341, as indicated by arrows 362 and 363, into mixing zones 335 and 345, respectively. In the mixing zones 315, 325, 335 and 345 the second fluid streams contact and mix with the first fluid stream to form the multiphase mixtures. The multiphase mixtures formed in mixing zones 315, 325, 335 and 345 can be the same or different. If different the multiphase mixtures may differ from one another with respect to composition and/or physical properties or operating parameters (e.g., composition of the dispersed and/or continuous phase, particle size, particle size distribution, viscosity, density, surface tension, temperature, pressure, flow rate, etc.). The multiphase mixtures flow from mixing zones 315, 325, 335 and 345 through non-apertured sections 316, 326, 336 and 346 out of the process microchannels 310, 320, 330 and 340, as indicated by arrows 318, 328, 338 and 348, respectively. Heating or cooling using heat exchange channels 370 and 380 may be optional. When heating or cooling is desired, heat exchange fluid flows through heat exchange channels 370 and 380, as indicated by arrows 371 and 372, and 381 and 382, and heats or cools the fluid in the channels 310, 320, 330, 340, 350 and 360. The degree of heating or cooling may vary over the length of each of the channels. The heating or cooling may be negligible or non-existent in some sections of the process channels and/or liquid channels, and moderate or relatively high in other sections. An advantage of this embodiment of the invention is that it may provide for the forming and evaluating of multiple product multiphase mixtures at the same time using the same apparatus. This can be advantageous when it is desired to screen multiple formulations as potential new products.

Figure 9:
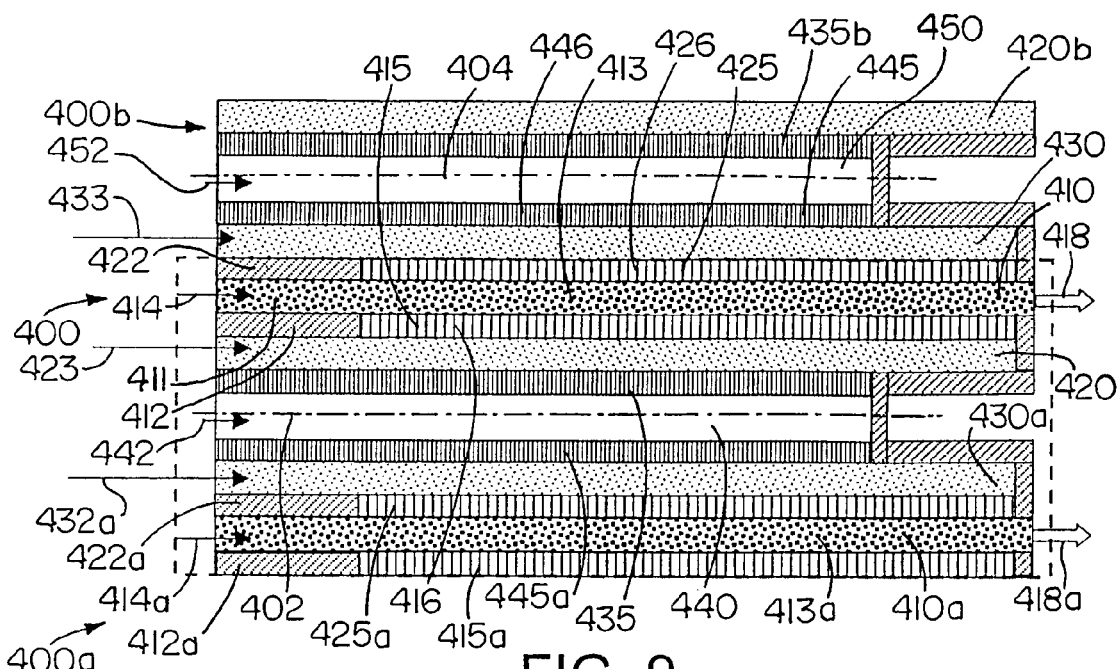

In one embodiment, the inventive process is suitable for making double multiphase mixtures. These double multiphase mixtures may be made using the multiphase mixture forming unit 400 illustrated in FIG. 9. In FIG. 9, the multiphase mixture forming unit 400 is positioned between center lines 402 and 404. Multiphase mixture forming unit 400 includes process microchannel 410, and fluid stream channels 420, 430, 440 and 450. Fluid stream channels 420 and 430 are adjacent to process microchannel 410. Fluid stream channel 440 is adjacent to fluid stream channel 420, and fluid stream channel 450 is adjacent to fluid stream channel 430. Common wall 412, which includes coarse apertured section 415, separates process microchannel 410 and fluid stream channel 420. Common wall 422, which includes coarse apertured section 425, separates process microchannel 410 and fluid stream channel 430. Apertured sections 415 and 425 contain apertures 416 and 426, respectively. Fine apertured section 435, which contains apertures 436, is positioned between and separates fluid stream channel 440 and fluid stream channel 420. Fine apertured section 445, which contains apertures 446, is positioned between and separates fluid stream channel 450 and fluid stream channel 430. The apertures 416 and 426 in the coarse apertured sections 415 and 425 are larger than the apertures 436 and 446 in the fine apertured sections 435 and 445. The process microchannel 410 has a non-apertured or non-porous region 411 and a mixing zone 413. The non-apertured region 411 extends from the entrance to the process to the entrance to the mixing zone 413. The mixing zone 413 is adjacent to the apertured sections 415 and 425. Optionally, heat exchange channels may be inserted in the positions shown by centerlines 402 and/or 404 to provide desired heating or cooling for the fluids.

Part of an adjacent multiphase mixture forming unit 400a, which is also illustrated in FIG. 9, is positioned below center line 402. The multiphase mixture forming unit 400a includes process microchannel 410a, coarse apertured sections 415a and 425a, fluid stream channel 430a, and fine apertured section 445a. These are the same as the process microchannel 410, coarse apertured sections 415 and 425, fluid stream channel 430, and fine apertured section 445 discussed above. Also, part of another adjacent multiphase mixture forming unit 400b is positioned above the center line 404 in FIG. 9. The multiphase mixture forming 400b includes fine apertured section 435b and fluid stream channel 420b. These are the same as the fine apertured section 435 and fluid stream channel 420 discussed above. The inclusion of parts of multiphase mixture forming units 400a and 400b in FIG. 9 illustrates the repeating character of the multiphase mixture forming unit 400 when it is employed in a microchannel mixer pursuant to the inventive process.

Figure 10:
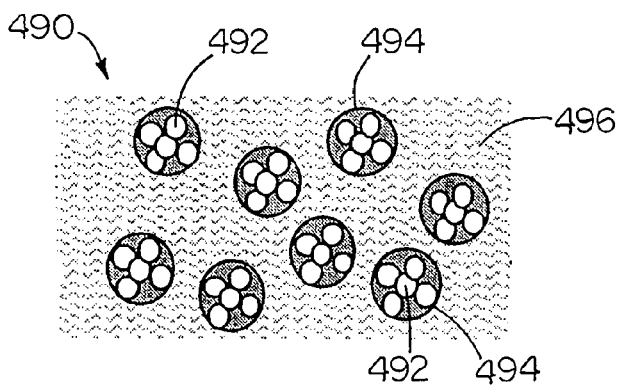
FIG. 10 is a schematic illustration of a double multiphase mixture.

In operation, referring to FIG. 9, a first fluid stream enters process microchannel 410, as indicated by arrow 414, and flows through the non-apertured region 411 into the mixing zone 413. A second fluid stream enters fluid stream channels 420 and 430, as indicated by arrows 423 and 433, respectively. A third fluid stream enters liquid channels 440 and 450, as indicated by arrows 442 and 452, respectively. The third fluid stream flows from fluid stream channel 440 through apertured section 435 into fluid stream channel 420 where it mixes with the second fluid stream and forms another multiphase mixture. Also, the third fluid stream flows from fluid stream channel 450 through apertured section 445 into fluid stream channel 430 where it mixes with the second fluid stream and forms another multiphase mixture. The third fluid stream forms a discontinuous phase and the second fluid stream forms a continuous phase in the another multiphase mixtures formed in the fluid stream channels 420 and 430. The another multiphase mixtures formed in the fluid stream channels 420 and 430 flow through the apertured sections 415 and 425, respectively, into mixing zone 413 where they mix with the first fluid stream. In the mixing zone 413, the another multiphase mixture is dispersed as a discontinuous phase in the first fluid stream, the first fluid stream being in the form of a continuous phase. The multiphase mixture that is formed in the mixing zone 413 may be referred to as a double multiphase mixture. In the double multiphase mixture at least part of the third fluid stream may be encapsulated within bubbles or microbodies (e.g., microspheres) of the second fluid stream. The encapsulated bubbles or microbodies may be dispersed as a discontinuous phase in the first fluid stream which may be in the form of a continuous phase. The double multiphase mixture exits process microchannel 410, as indicated by arrow 418. The double multiphase mixture, in one embodiment, which may be in the form schematically illustrated in FIG. 10 as multiphase mixture 490, comprises a third stream fluid 492 (i.e., gas) encapsulated within a second stream fluid 494 (e.g., liquid or microbody) which is dispersed in a first stream fluid 496 (e.g., gas or liquid).

Figure 11:
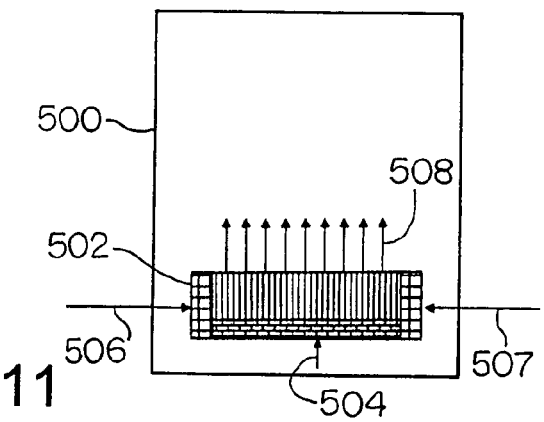
FIG. 11 is a schematic illustration of a microchannel aeration device that can be used in accordance with the inventive process.
Figure 12:
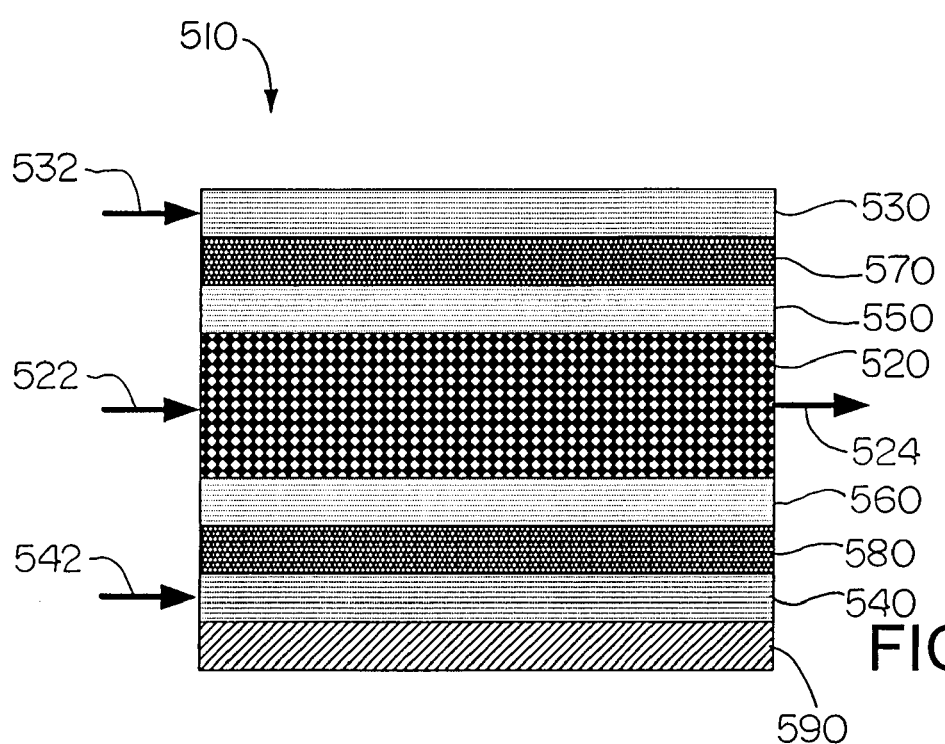
FIG. 12 is a schematic illustration of a microchannel multiphase mixture forming unit that can be used in the aeration device illustrated in FIG. 11.

In one embodiment, the inventive process may be used in an aeration process. This is illustrated in FIGS. 11 and 12. In this embodiment, the process is conducted using aeration tank 500 which includes microchannel mixer 502. In operation, a fluid to be aerated is contained within the tank 500 and enters the microchannel mixer 502 as a first fluid stream, as indicated by arrow 504. An example of a fluid that can be aerated is a cell broth. A second fluid stream enters the microchannel mixer 502, as indicated by arrow 506. The second fluid stream may comprise air or oxygen. In the microchannel mixer, the first fluid stream (e.g., cell broth) and the second fluid stream (e.g., air or oxygen) are mixed with the result being the formation of a multi-phase mixture (e.g., an aerated cell broth). The microchannel mixer 502 may comprise a plurality of multiphase mixture forming units 510. The multiphase mixture forming units 510 comprise process microchannel 520, second fluid stream channels 530 and 540, apertured sections 550 and 560 which may be in the form of fine ceramic membranes, apertured sections 570 and 580 which may be in the form of macroporous supports, and heat exchange channel 590. In operation, the first fluid stream enters the process microchannel 520, as indicated by arrow 522. The second fluid stream enters the second stream fluid channels 530 and 540, as indicated by arrows 532 and 542, respectively. The second fluid stream flows from the second fluid stream channel 532 through the apertured section 570 and then through the apertured section 550 into the process microchannel 520. Similarly, another second fluid stream enters second fluid stream channel 540, as indicated by arrow 542, and flows through apertured section 580 and then through apertured section 560 into the process microchannel 520. The first fluid stream and the second fluid stream are mixed in the process microchannel 520 resulting in the formation of a multiphase mixture. The multiphase mixture exits the process microchannel 520, as indicated by arrow 524. In the multiphase mixture, the first fluid stream may form a continuous phase, and the second fluid stream may form a discontinuous phase. In one embodiment, the multiphase mixture may comprise a cell broth with an enhanced level of oxygen or air dispersed throughout the cell broth. The fluids can be heated or cooled by flowing a heat exchange fluid into the microchannel mixer 502, as indicated by arrow 507, through heat exchange channel 590, and then out of the microchannel mixer 502.

Although only one multiphase mixture forming unit is fully illustrated in each of FIGS. 3-9 and 12, there is practically no upper limit to the number of multiphase mixture forming units that may be used in a microchannel mixer for conducting the inventive process. For example, one, two, three, four, five, six, eight, ten, twenty, fifty, one hundred, hundreds, one thousand, thousands, ten thousand, tens of thousands, one hundred thousand, hundreds of thousands, millions, etc., of the multiphase mixture forming units described above may be used. In one embodiment, each multiphase mixture forming unit may be manifolded. Manifolding may be effected by connecting macrotubing, piping or ducting to each unit. Alternatively, many of the multiphase mixture forming units may be internally manifolded within a microchannel mixer containing the multiphase mixture forming units by creating relatively equal pressure drop circuits between each unit. On the other hand, the pressure drop may not be equal between each unit, as some flow maldistribution may not affect product quality. In one embodiment, up to about a 50% flow maldistribution may be acceptable in forming a multiphase mixture using the inventive process. The process microchannels, and associated second and third fluid stream channels and heat exchange channels may be aligned side-by-side or stacked one above another. For the multiphase mixture forming units 200 and 200A, for example, the process microchannels 210 may be aligned in parallel in one plane, the second fluid stream channels 270 may be aligned in parallel in an adjacent plane on one side of the process microchannels 210, and the heat exchange channels 290 may be aligned in parallel in another plane on the other side of the process microchannels 210. For the multiphase mixture forming units 200B and 200C, for example, the process microchannels 210 may be aligned in parallel in one plane, the second fluid stream channels 270 and 270a may be aligned in parallel in adjacent planes on each side of the process microchannels 210, and the heat exchange channels 290 may be aligned in parallel in a plane adjacent to the second fluid stream channels 270a. For the multiphase mixture forming unit 200D, the second fluid stream channels 270 may be aligned in parallel in one plane, the process microchannels 210 and 210a may be aligned in parallel in adjacent planes on each side of the liquid channels 270, and the heat exchange channels 290 may be aligned in parallel in a plane adjacent to the process microchannel 210. These multiphase mixture forming units may have appropriate headers, footers, manifolds, valves, conduit lines, tubings, control mechanisms, etc., to control the input and output of process liquids and heat exchange fluids which are not shown in FIGS. 3-9 and 12, but can be provided by those skilled in the art. For example, at the inlet and outlet to the microchannel mixer containing the multiphase mixture forming units, sloped headers and footers may be used for connecting the conduit lines or tubings to avoid unnecessary pressure drops associated with the size of the process microchannels.

In one embodiment, a plurality of multiphase mixture forming units (200, 200A, 200B, 200C, 200D, 300, 400, 510) may be stacked one above another to form a core of units scaled up for on-demand large capacity. The scaled-up units may have sloped headers and footers as manifolds for the liquids used to form the multiphase mixtures as well as for the multiphase mixture products. More uniform flow distribution may also be enhanced by the addition of an orifice plate or other apertured zone at the entrance of the process or dispersed phase or heat exchange channels. Frame sections may be used to hold and seal the multiphase mixture forming units.

Each of the process microchannels (210, 210a, 310, 320, 330, 340, 410, 520) may have a cross section that has any configuration, for example, square, rectangular, circular, annular, oval, trapezoidal, etc. The process microchannels may be tubular. The process microchannels may be formed from parallel spaced sheets and/or plates positioned side-by-side or one above another. The term "sheet" refers to a wall thickness of up to about 5 mm. The term "plate" refers to a wall thickness of about 5 mm or higher. Sheets may be supplied to the user in roll form while plates may be supplied to the user in the form of flat pieces of material. Each of the process microchannels may have an internal dimension perpendicular to the flow of fluid through the process microchannel (for example, height, width or diameter) in the range of up to about 50 mm, and in one embodiment up to about 10 mm, and in one embodiment up to about 2 mm. This dimension may be in the range from about 0.05 to about 50 mm, and in one embodiment about 0.05 to about 10 mm, and in one embodiment about 0.05 to about 5 mm, and in one embodiment about 0.05 to about 2 mm, and in one embodiment about 0.05 to about 1.5 mm, and in one embodiment about 0.05 to about 1 mm, and in one embodiment about 0.05 to about 0.5 mm. Another internal dimension perpendicular to the flow of fluid through the process microchannel (for example, height or width) may be of any value, for example, it may be in the range from about 0.01 cm to about 100 cm, and in one embodiment from about 0.01 cm to about 75 cm, and in one embodiment from about 0.1 cm to about 50 cm, and in one embodiment about 0.2 cm to about 25 cm. The length of each of the process microchannels may be of any value, for example, in the range from about 0.1 cm to about 500 cm, and in one embodiment about 0.1 cm to about 250 cm, and in one embodiment about 1 cm to about 100 cm, and in one embodiment about 1 cm to about 50 cm, and in one embodiment about 2 cm to about 25 cm.

In one embodiment, the process microchannels (210, 210a, 310, 320, 330, 340, 410, 520) may have a non-apertured or non-porous region (211, 211a, 314, 324, 334, 344, 411) in their entrances upstream of the mixing zones (213, 213a, 315, 325, 335, 345, 413) to provide an even distribution of flow of the first liquid in the process microchannels. This may be useful when multiple process microchannels are aligned side-by-side and/or one-above-another, and the flow of the first fluid stream into the multiple process microchannels is non-uniform. The provision of these non-apertured regions may stabilize the flow of the first fluid stream prior to reaching the mixing zones. The use of the non-apertured or non-porous regions may be advantageous when the process microchannels have circular cross sections (i.e., tubular geometries). In one embodiment, the ratio of the length of the non-apertured region from the entrance to the process microchannel to the entrance to the mixing zone relative to the smallest internal dimension of the process microchannel in the non-apertured or non-porous region may be in the range from about 0.0001 to about 10000, and in one embodiment about 0.001 to about 1000.

One or more of the interior walls of the process microchannels (210, 210a, 310, 320, 330, 340, 410, 520) may have surface features for modifying flow within the process microchannels. Examples of these surface features are illustrated in FIGS. 22-26. The surface features may have two or more layers stacked on top of each other or intertwined in a three-dimensional pattern. The pattern in each discrete layer may be the same or different. Flow may rotate or advect in each layer or only in one layer. Sub-layers, which may not be adjacent to the bulk flow channel, may be used to create additional surface area. For example, these may be used to deposit a catalyst. The flow may rotate in the first level of surface feature and diffuse molecularly into the second or more sublayers to promote reaction. Three-dimensional features may be made via metal casting or other processes where varying patterns may not be broken into discrete planes as if stacked on top of each other. Three-dimensionally varying surface features may be found adjacent to the bulk flow channel where the features have different depths, shapes, and locations accompanied by sub-features with patterns of varying depths, shapes and locations. The surface structures may be advantageous for chemical reactions requiring additional surface area for catalyst deposition or for chemical separations such as distillation.

Figure 23:
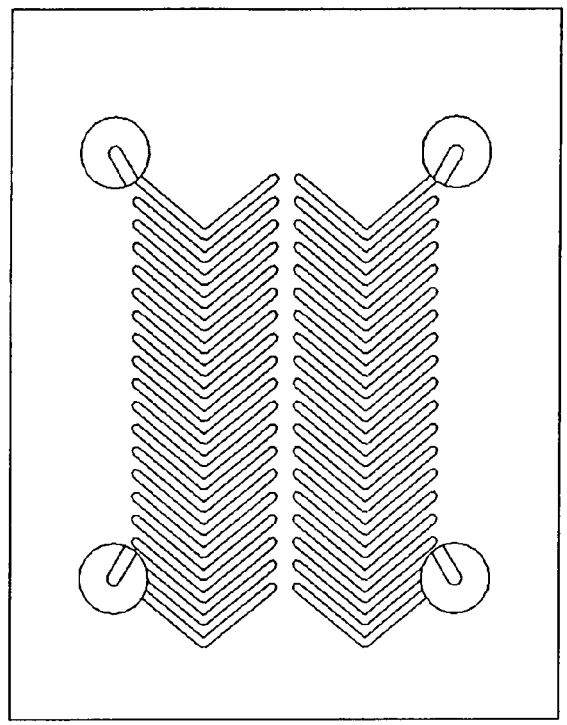
Figure 24:
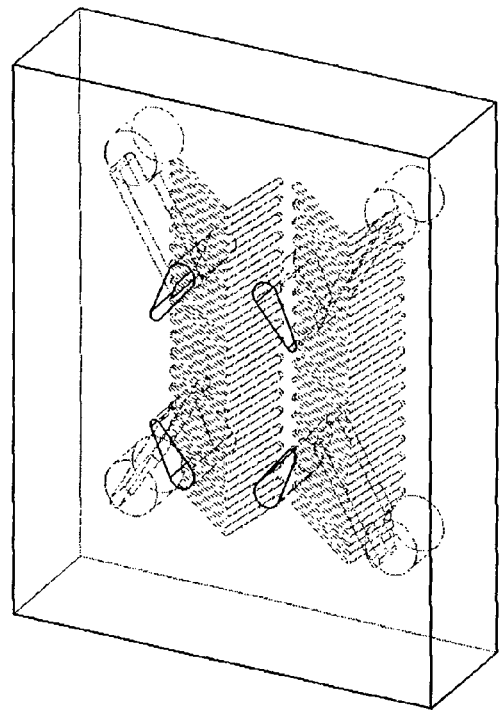

FIG. 23 is a schematic illustration of a top view of a three-dimensional surface feature structure. An example of a back view of a three dimensional surface feature structure is illustrated in FIG. 24 where recessed chevrons are found at the interface adjacent of the bulk flow microchannel and beneath the chevrons are a series of three-dimensional structures that connect to the features adjacent to the bulk flow path but are made from structures of assorted shapes, depths, and locations. It may be further advantageous to create sublayer passages that do not directly fall beneath an open surface feature that is adjacent to the bulk flow microchannel but rather connect through one or more tortuous two-dimensional or three-dimensional passages. This approach may be advantageous for creating tailored residence time distributions in reactors, where it may be desirable to have a wider versus more narrow residence time distribution.

Figure 25:
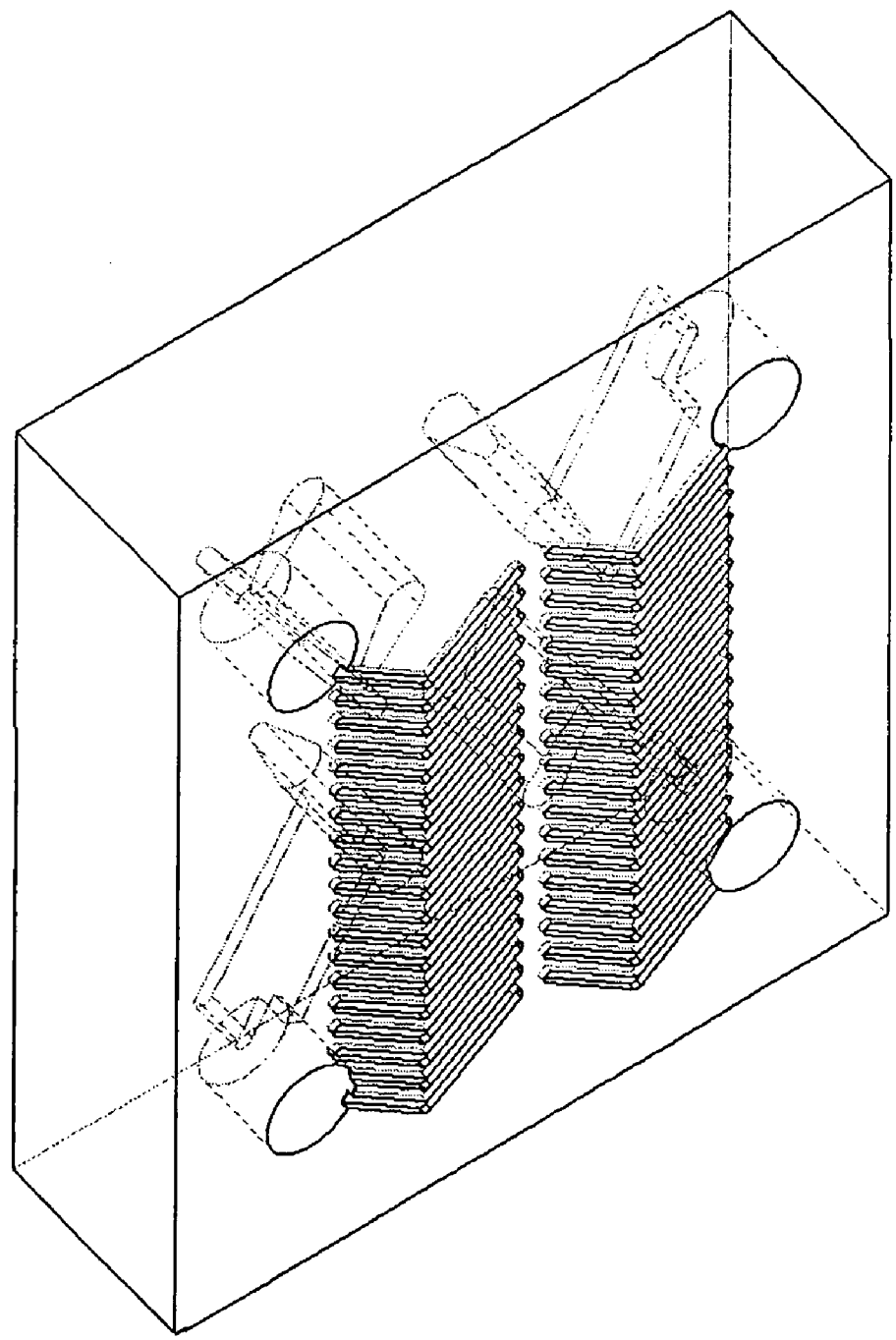

FIG. 25 is a front view of a three-dimensional surface feature where recessed chevrons abut the bulk flow microchannel and have additional features of different shapes behind them at varying depths and locations.

The surface features may have a depth that is less than about 2 mm, and in one embodiment less than about 1 mm, and in one embodiment in the range from about 0.01 mm to about 0.5 mm. The lateral width of the surface features may be sufficient to nearly span the microchannel width (as shown in the herringbone designs), but in one embodiment (such as the fill features) can span about 60% or less, and in one embodiment about 40% or less, and in one embodiment from about 0.1% to about 60%, and in one embodiment from about 0.1% to about 50% of the microchannel width.

The lateral width of the surface feature may be in the range from about 0.05 mm to about 100 cm, and in one embodiment in the range from about 0.5 mm to about 5 cm, and in one embodiment in the range from about 1 to about 2 cm.

The length and width of a surface feature may be defined in the same way as the length and width for a microchannel. The depth may be the distance which the surface feature sinks into the microchannel surface; it is the same direction as microchannel height or microchannel gap. This may correspond to the direction of stacking stacked and bonded microchannel device with surface features formed on or in the sheet surfaces. These dimensions for the surface features refer the maximum dimension of a surface feature; for example the depth of a rounded groove may refer to the maximum depth, that is, the depth at the bottom of the groove.

Multiple surface features or regions of surface features may be included within a microchannel, including features that recess at different depths into one or more microchannel walls. The spacing between recesses may be in the range from about 0.01 mm to about 10 mm, and in one embodiment in the range from about 0.1 to about 1 mm. The surface features may be present throughout the entire length of a microchannel or in portions or regions of the microchannel. The portion or region having surfaced features may be intermittent so as to promote a desired reaction or unit operation in tailored zones. For example, a one-inch section of a microchannel may have a tightly spaced array of surface features, followed by four inches of a flat channel without surface features, followed by a two-inch section of loosely spaced surface features. Loosely spaced surface features refers to surface features with a pitch or feature to feature distance more than five times the run width of the surface feature.

In one embodiment, the surface features may extend substantially over the entire axial length of a microchannel. In one embodiment, a microchannel may have surface features over about 50% or less of its axial length, and in one embodiment over about 20% or less of its axial length. In one embodiment, the surface features may extend over about 10% to about 100% of the axial length of the microchannel.

Figure 26:
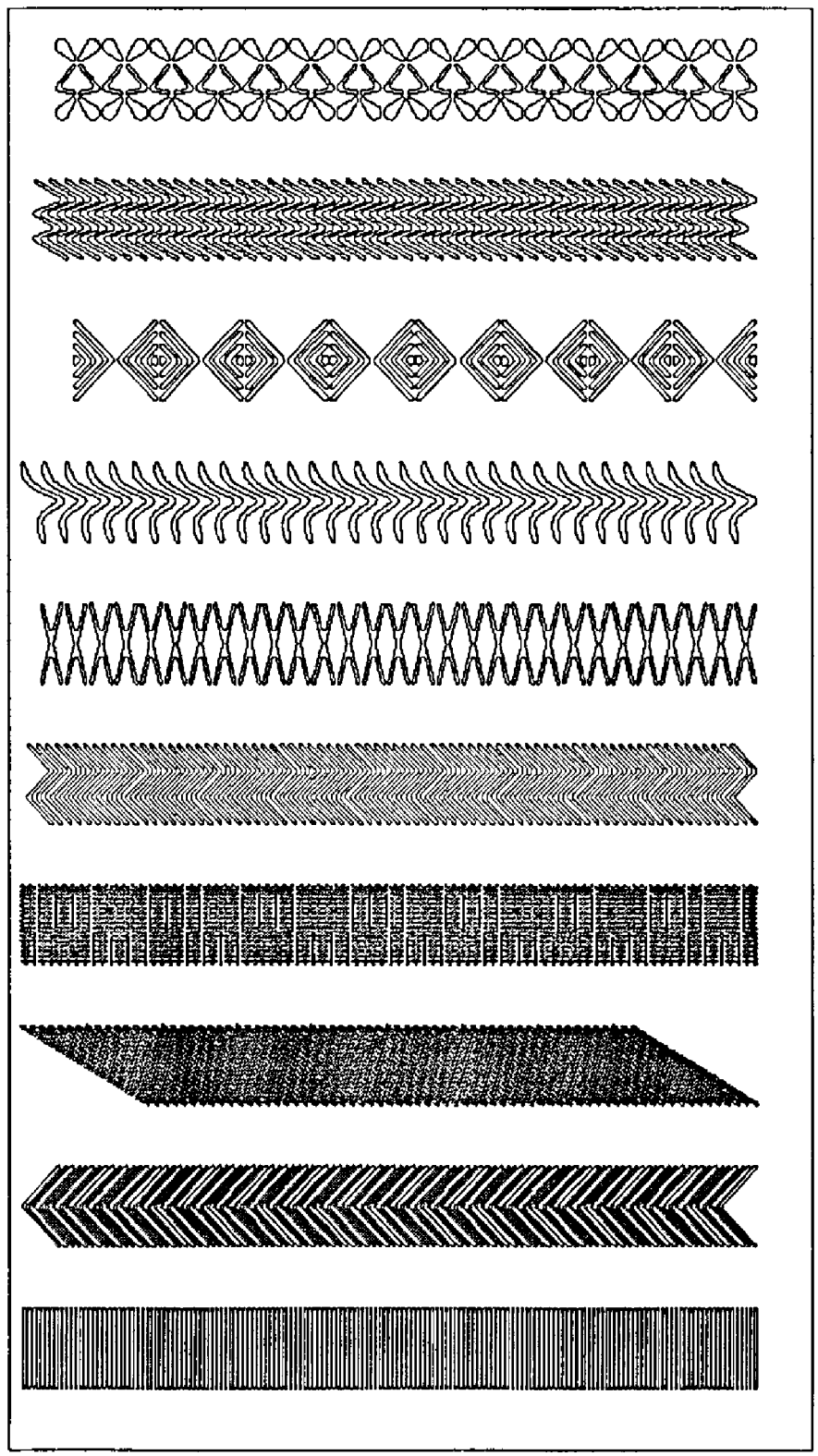

FIG. 26 shows a number of different patterns that may be used for surface features. These patterns are not intended to limit the invention, only to illustrate a number of possibilities. As with any surface feature, the patterns may be used in different axial or lateral sections of a microchannel.

The second fluid stream channels (270, 270a, 350, 360, 420, 430, 530, 540) and the third fluid stream channels (440, 450) may be microchannels although they may have larger dimensions that would not characterize them as microchannels. Each of these channels may have a cross section that has any configuration, for example, square, rectangular, circular, annular, oval, trapezoidal, etc. These channels may contain surface features as described above. The second and third fluid stream channels may be tubular. The second and third fluid stream channels may be formed from parallel spaced sheets and/or plates positioned side-by-side or one-above-another. Each second and third fluid stream channel may have an internal dimension perpendicular to the flow of fluid through the second and third fluid stream channel (for example, height, width or diameter) in the range up to about 100 cm, and in one embodiment in the range from about 0.05 mm to about 100 cm, and in one embodiment about 0.05 mm to about 50 cm, and in one embodiment from about 0.05 mm to about 10 cm, and in one embodiment from about 0.05 mm to about 5 cm, and in one embodiment about 0.05 mm to about 10 mm, and in one embodiment about 0.05 mm to about 5 mm, and in one embodiment about 0.05 mm to about 2 mm, and in one embodiment about 0.05 mm to about 1 mm. Another internal dimension perpendicular to the flow of fluid through the second and third fluid stream channels (for example, height or width) may be in the range from about 0.01 cm to about 100 cm, and in one embodiment about 0.01 cm to about 75 cm, and in one embodiment about 0.1 cm to about 50 cm, and in one embodiment about 0.2 cm to about 25 cm. The length of the second and third fluid stream channels may be of any value, for example, in the range from about 0.1 cm to about 500 cm, and in one embodiment about 0.1 cm to about 250 cm, and in one embodiment about 1 cm to about 100 cm, and in one embodiment about 1 cm to about 50 cm, and in one embodiment about 2 cm to about 25 cm. The separation between each process microchannel and the next adjacent second fluid stream channel or between adjacent second and third fluid stream channels may be in the range from about 0.05 mm to about 50 mm, and in one embodiment from about 0.1 to about 10 mm, and in one embodiment from about 0.2 mm to about 2 mm.

The heat source and/or heat sink may be used for cooling, heating or both cooling and heating. The heat source and/or heat sink may comprise one or more heat exchange channels. The heat source may comprise one or more electric heating elements or resistance heaters. The heat sink may comprise one or more non-fluid cooling elements. These may be adjacent to the process microchannels and/or second or third fluid stream channels. In one embodiment, the heat source and/or heat sink may not be in contact with or adjacent to the process microchannel and/or second or third fluid stream channels, but rather can be remote from either or both the process microchannel and/or second or third fluid stream channels, but sufficiently close to the process microchannel and/or second or third fluid stream channels to transfer heat between the heat source and/or heat sink and the process microchannels and/or second or third fluid stream channels. The electric heating element, resistance heater and/or non-fluid cooling element can be used to form one or more walls of the process microchannels (210, 310a, 310, 320, 330, 340, 410, 520), second fluid stream channels (270, 270a, 350, 360, 420, 430, 530, 540) and/or third fluid stream channels (440, 450). The electric heating element, resistance heater and/or non-fluid cooling element can be built into one or more walls of the process microchannels, second fluid stream channels and/or third fluid stream channels. The electric heating elements and/or resistance heaters can be thin sheets, rods, wires, discs or structures of other shapes embedded in the walls of the process microchannels and/or liquid channels. The electric heating elements and/or resistance heaters can be in the form of foil or wire adhered to the process microchannel walls and/or liquid channel wall. Heating and/or cooling may be effected using Peltier-type thermoelectric cooling and/or heating elements. Multiple heating and/or cooling zones may be employed along the length of the process microchannels, second fluid stream channels and/or third fluid stream channels. Similarly, heat transfer fluids at different temperatures in one or more heat exchange channels may be employed along the length of the process microchannels, second fluid stream channels and/or third fluid stream channels. The heat source and/or heat sink can be used to provide precise temperature control within the process microchannels, second fluid stream channels and/or third fluid stream channels.

The heat exchange channels (290, 370, 380, 590) may be microchannels although they may have larger dimensions that would not typically characterize them as microchannels. Each of these channels may have a cross section that has any configuration, for example, square, rectangular, circular, annular, oval, trapezoidal, etc. The heat exchange channels may be tubular. The heat exchange channels along with adjacent process microchannels or second or third fluid stream channels may be formed from parallel spaced sheets and/or plates positioned side-by-side or one-above-another. These channels may contain surface features as described above. Each of the heat exchange channels may have an internal dimension perpendicular to the flow of heat exchange fluid through the heat exchange channel, for example height, width or diameter, in the range up to about 50 mm, and in one embodiment up to about 10 mm, and in one embodiment up to about 2 mm. This dimension may be in the range from about 0.05 to about 50 mm, and in one embodiment about 0.05 to about 10 mm, and in one embodiment about 0.05 to about 5 mm, and in one embodiment from about 0.05 to about 2 mm, and in one embodiment from about 0.5 to about 1 mm. Another internal dimension perpendicular to the flow of heat exchange fluid through the heat exchange channel, for example height or width, may be of any value, for example, in the range from about 0.01 cm to about 100 cm, and in one embodiment about 0.01 cm to about 75 cm, and in one embodiment about 0.1 cm to about 50 cm, and in one embodiment about 0.2 cm to about 25 cm. The length of the heat exchange channels may be of any value, for example, in the range from about 0.1 cm to about 500 cm, and in one embodiment about 0.1 cm to about 250 cm, and in one embodiment about 1 cm to about 100 cm, and in one embodiment about 1 cm to about 50 cm, and in one embodiment about 2 cm to about 25 cm. The separation between each process microchannel or second or third fluid stream channel and the next adjacent heat exchange channel may be in the range from about 0.05 mm to about 50 mm, and in one embodiment about 0.1 to about 10 mm, and in one embodiment about 0.2 mm to about 2 mm.

The heat exchange channels (290, 370, 380, 590) may be adapted for heat exchange fluid to flow through the channels in a direction parallel to and co-current with the flow of fluid through the adjacent process microchannels or second or third fluid stream channels. Alternatively, the heat exchange fluid may flow through the heat exchange channels in a direction that is countercurrent to the flow of fluid through the process microchannels or second or third fluid stream channels. Alternatively, the heat exchange channels may be oriented relative to the process microchannels or second or third fluid stream channels to provide for the flow of heat exchange fluid in a direction that is cross-current relative to the flow of fluid through the process microchannels or second or third fluid stream channels. The heat exchange channels may have a serpentine configuration to provide a combination of cross-flow and co-current or counter-current flow.

In one embodiment, the process microchannels (210, 210a, 310, 320, 330, 340, 410, 520), second fluid stream channels (270, 270a, 350, 360, 420, 430, 530, 540), third fluid stream channels (440, 450), and/or heat exchange channels (290, 370, 380, 590) have square or rectangular cross sections and are formed from parallel spaced sheets or plates. These channels may be aligned in side-by-side vertically oriented interleaved planes, or horizontally oriented interleaved planes stacked one above another. These configurations, which may be referred to as parallel plate configurations, have a number of advantages. In comparison with circular tubes, for example, parallel plate configurations incur less pressure drop while the same shear force is realized for the height or width, or diameter at the same continuous phase mass flux. When the aspect ratio of a rectangular channel approaches, for example, about 10, i.e., approaches a parallel sheet or plate configuration, its pressure drop may be only about 50% of that in a circular channel under the same conditions. Process microchannels, second fluid stream channels, third fluid stream channels, and heat transfer channels having parallel plate configurations can be easily arranged in a compact device for scale-up. Also, a higher capacity per unit volume for the multiphase mixture forming process can be achieved with parallel plate configurations as compared with circular tubes.

An advantage of using parallel plate configurations is that these configurations have larger fluid/wall material ratios as compared to circular tubes, and are thus more compact with the potential for higher capacity or output.

In one embodiment, the process microchannels (210, 210a, 310, 320, 330, 340, 410, 520), second fluid stream channels (270, 270a, 350, 360, 420, 430, 530, 540), and optionally the third fluid stream channels (440, 450) and/or heat exchange channels (290, 370, 380, 590), may be in the form of circular tubes arranged concentrically. The process microchannels and second fluid stream channels may be adjacent to each other with one channel being in the annular space and the other channel being in the center space or an adjacent annular space. In one embodiment, a microchannel mixer that is useful with the inventive process may comprise a plurality of alternating interleaved concentric tubular process microchannels, second fluid stream channels, and optionally third fluid stream channels and/or heat exchange channels, the microchannel mixer being in cylindrical form.

Figure 13:
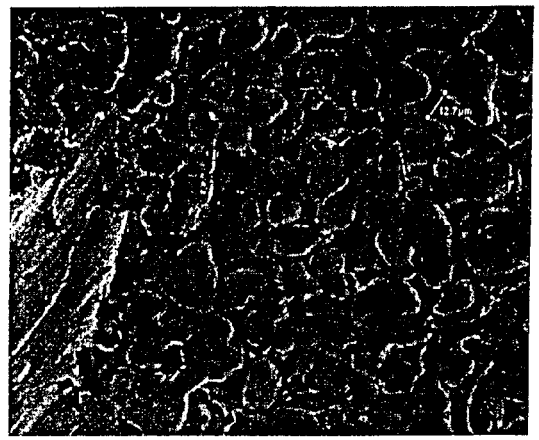
FIG. 13 is an SEM image of a porous stainless steel substrate before being heat treated.
Figure 14:
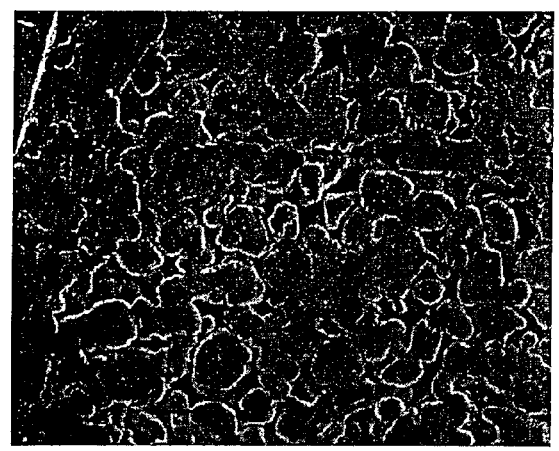
FIG. 14 is an SEM image of the substrate illustrated in FIG. 8 after being heat treated.

The apertures (244, 244a, 313, 323, 333, 343, 416, 426, 436, 446) may be of sufficient size to permit the flow of the indicated fluid through the apertured sections. The apertures may be referred to as pores. The apertured section (240, 240a, 311, 321, 331, 341, 415, 425, 435, 445, 550, 560, 570, 580) may have a thickness in the range from about 0.01 to about 50 mm, and in one embodiment about 0.05 to about 10 mm, and in one embodiment about 0.1 to about 2 mm. The apertures may have an average diameter in the range of up to about 50 microns, and in one embodiment in the range from about 0.001 to about 50 microns, and in one embodiment from about 0.05 to about 50 microns, and in one embodiment from about 0.1 to about 50 microns. In one embodiment, the apertures may have an average diameter in the range from about 0.5 to about 10 nanometers (nm), and in one embodiment about 1 to about 10 nm, and in one embodiment about 5 to about 10 nm. The number of apertures in the apertured sections may be in the range from about 10 to about 5×10⁸ apertures per square centimeter, and in one embodiment about 1 to about 1×10⁶ apertures per square centimeter. The apertures may or may not be isolated from each other. A portion or all of the apertures may be in fluid communication with other apertures within the apertured section. The ratio of the thickness of the apertured sections to the length of the apertured sections along the flow path of the fluid flowing through the process microchannels (210, 210a, 310, 320, 330, 340, 410, 520) may be in the range from about 0.001 to about 100, and in one embodiment about 0.01 to about 50, and in one embodiment about 0.03 to about 25, and in one embodiment about 0.05 to about 10, and in one embodiment about 0.08 to about 5, and in one embodiment about 0.1 to about 1. The apertured sections may be constructed of any material that provides sufficient strength and dimensional stability to permit the operation of the inventive process. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; microporous carbon, including carbon nanotubes or carbon molecular sieves; zeolites; or a combination of two or more thereof. The apertures may be formed using known techniques such as laser drilling, microelectro machining system (MEMS), lithography electrodeposition and molding (LIGA), electrical sparkling or electrochemical etching. The apertures may be formed using techniques used for making structured plastics, such as extrusion, or membranes, such as aligned carbon nanotube (CNT) membranes. The apertures may be formed using techniques such as sintering or compressing metallic powder or particles to form tortuous interconnected capillary channels and the techniques of membrane fabrication. The aperatures may be reduced in size from the size provided by any of these methods by the application of coatings over the apertures internal side walls to partially fill the apertures. The selective coatings may also form a thin layer exterior to the porous body that provides the smallest pore size adjacent to the continuous flow path. The smallest average pore opening may be in the range from about one nanometer to about several hundred microns depending upon the desired droplet size for the multiphase mixture. The aperatures may be reduced in size by heat treating as well as by methods that form an oxide scale or coating on the internal side walls of the apertures. These techniques may be used to partially occlude the aperatures to reduce the size of the openings for flow. FIGS. 13 and 14 show a comparison of SEM surface structures of a stainless steel porous substrate before and after heat treatment at the same magnification and the same location. FIG. 13 shows the surface before heat treating and FIG. 14 shows the surface after heat treating. The surface of the porous material after the heat treatment has a significantly smaller gap and opening size. The average distance between the openings is correspondingly increased.

Figure 15:
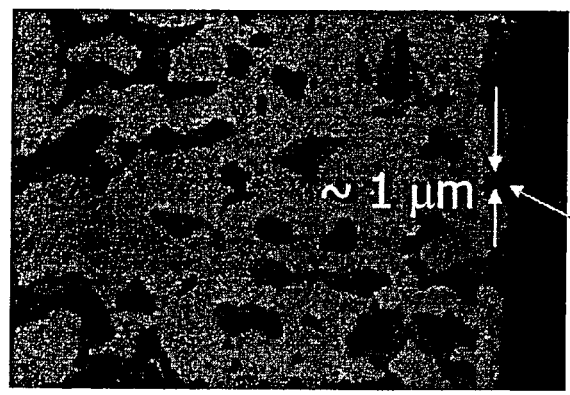
FIG. 15 is an SEM image of a tailored porous substrate useful with the inventive process.
Figure 22:
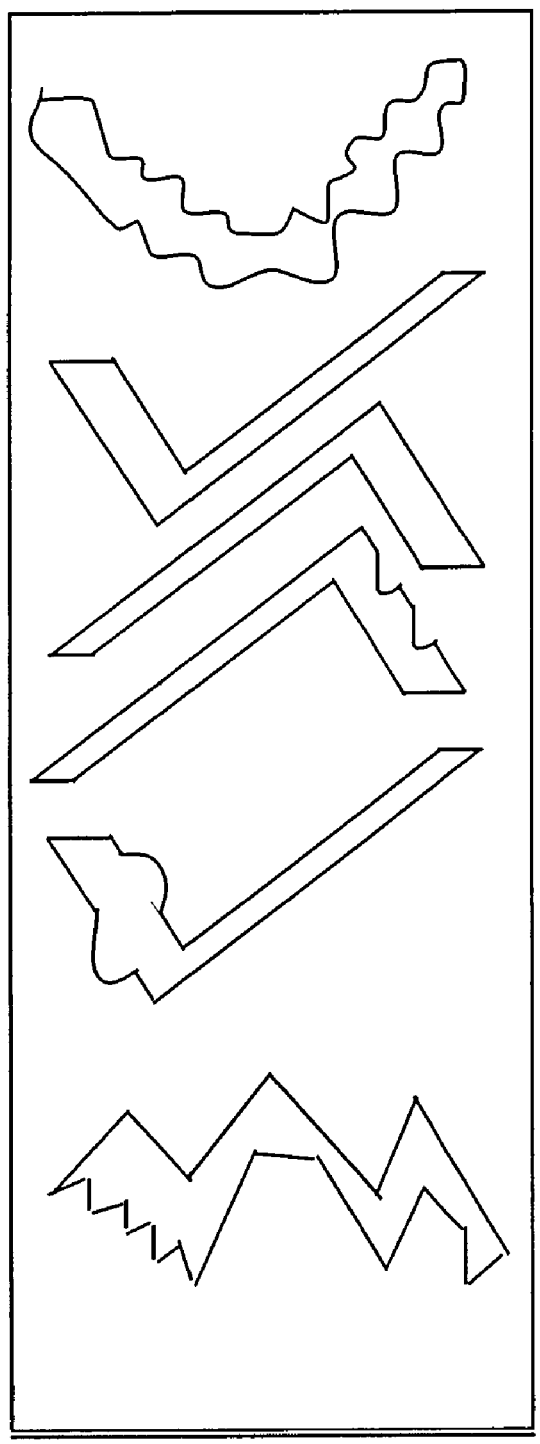
FIGS. 22-26 are schematic illustrations of surface features that may be provided in microchannels used with the inventive process.

The apertured sections (240, 240a, 311, 321, 331, 341, 415, 425, 435, 445, 550, 560, 570, 580) may be made from a metallic or nonmetallic porous material having interconnected channels or pores of an average pore size in the range from about 0.01 to about 200 microns. These pores may function as the apertures (244, 244a, 313, 323, 333, 343, 416, 426, 436, 446). The porous material may be made from powder or particulates so that the average inter-pore distance is similar to the average pore size. When very small pore sizes are used, the inter-pore distance may also be very small and the droplets may merge at the surface in the side of process microchannels (210, 210a, 310, 320, 330, 340, 410, 520) or second fluid stream channels (420, 430) to form unwanted larger droplets. The porous material may be tailored by oxidization at a high temperature in the range from about 300° C. to about 1000° C. for a duration of about 1 hour to about 20 days, or by coating a thin layer of another material such as alumina by sol coating or nickel using chemical vapor deposition over the surface and the inside of pores to block the smaller pores, decrease pore size of larger pores, and in turn increase the inter-pore distance. As such, the merger of droplets may be reduced or eliminated and the formation of smaller droplets may be permitted. An SEM image of a tailored substrate or apertured section is shown in FIG. 15.

The apertures (244, 244a, 313, 323, 333, 343, 416, 426, 436, 446) may be regularly spaced throughout the entire mixing zone (213, 213a, 315, 325, 335, 345, 413). The aperatures may be preferentially spaced such that smaller or larger apertures are used closer to either the front or back of the mixing zone. The apertures may be closer together near the beginning of the mixing zone and further apart near the end of the mixing zone to assist with inhibiting droplet coalescence. The making of substrates for use as apertured sections (240, 240a, 311, 321, 331, 341, 415, 425, 435, 445, 550, 560, 570, 580) with sufficiently small micro-scale apertures or pores (244, 244a, 313, 323, 333, 343, 416, 426, 436, 446) to provide multiphase mixtures having bubble or microsphere sizes smaller than about one micron can be problematic. One of the reasons for this lies in the fact that relatively high surface roughness occurs with untreated regular porous materials such as a metallic porous substrates made from powder/particles by compression and/or sintering. These metallic porous substrates typically do not have the required pore size in the surface region when a given nominal pore size is lower than a certain value. While the bulk of the porous material may have the specified nominal pore size, the surface region is often characterized by merged pores and cavities of much larger sizes. This problem can be overcome by tailoring these substrates to provide for the desired pore size and inter-pore distance in the surface region. This may be done by removing a surface layer from the porous substrate and exposing or adding a smooth new surface with smaller openings. The bubble or microsphere size in the multiphase mixture that may be formed using these tailored substrates may be reduced without increasing the pressure drop across the substrate. Since direct grinding or machining of the porous surface may cause smearing of the surface structure and blockage of the pores, the porous structure may be filled with a liquid filler, followed by solidification and mechanical grinding/polishing. The filler is then removed to regain the porous structure of the material. The filler may be a metal with a low melting point such as zinc or tin or the precursor of a polymer such as an epoxy. The liquid filling and removing steps may be assisted by the use of a vacuum. Grinding/polishing may be effected using a grinding machine and a grinding powder. Metal filler removal may be effected by melting and vacuum suction, or by acid etching. Epoxies or other polymers may be removed by solvent dissolution or by burn-off in air.

Referring to FIGS. 16-19, the apertured sections (240, 240a, 311, 321, 331, 341, 415, 425, 435, 445, 550, 560, 570, 580), in one embodiment, may be constructed of a relatively thin sheet 600 containing relatively small apertures 602, and a relatively thick sheet or plate 610 containing an array of relatively large apertures 612 which may be coaxially aligned with or connected to apertures 600. The relatively thin sheet 600 overlies and is bonded to the relatively thick sheet 610, the relatively thin sheet 600 facing the interior of process microchannel (210, 210a, 310, 320, 330, 340, 410) or second fluid stream channels (420, 430) and the relatively thick sheet 610 facing the interior of the second fluid stream channel (270, 270a, 350, 360, 420, 430, 530, 540) or third fluid stream channel (440, 450). The relatively thin sheet 600 may be bonded to the relatively thick sheet 610 using any suitable procedure (e.g., diffusion bonding) to provide a composite construction 620 with enhanced mechanical strength. The relatively thin sheet 600 may have a thickness in the range from about 0.001 to about 0.5 mm, and in one embodiment about 0.05 to about 0.2 mm. The relatively small apertures 602 may have any shape, for example, circular, triangular or rectangular. The relatively small apertures 602 may have an average diameter in the range from about 0.05 to about 50 microns, and in one embodiment about 0.05 to about 20 microns. The relatively thick sheet or plate 610 may have a thickness in the range from about 0.1 to about 5 mm, and in one embodiment about 0.1 to about 2 mm. The relatively large apertures 612 may have any shape, for example, circular, triangular or rectangular. The relatively large apertures 612 may have an average diameter in the range from about 0.1 to about 4000 microns, and in one embodiment about 1 to about 2000 microns, and in one embodiment about 10 to about 1000 micron. The number of apertures 602 in sheet 600 and the number of apertures 612 in sheet or plate 610 may each be in the range from about 2 to about 10000 apertures per square centimeter, and in one embodiment from about 2 to about 1000 apertures per square centimeter. The sheet 600 and the sheet or plate 610 may be constructed of any of the materials described above as being useful for constructing the apertured sections (240, 240a, 311, 321, 331, 341, 415, 425, 435, 445, 550, 560, 570, 580). The apertures 602 and 612 may be coaxially aligned or connected in such a manner that liquid flowing through the apertured sections flows initially through apertures 612 then through apertures 602. The relatively short passageway for the liquid to flow through the relatively small apertures 602 enables the liquid to flow through the apertures 602 with a relatively low pressure drop as compared to the pressure drop that would occur if the passageway in the apertures had a length equal to the combined length of apertures 602 and 612.

In the embodiment illustrated in FIG. 19, the composite construction 620a has the same design as illustrated in FIG. 18 with the exception that convex portion 604 of the relatively thin sheet 600 covering the aperture 612 is provided. Convex portion 604 provides increased local shear force in the adjacent channel. The directional arrows 630 in FIG. 19 show the flow of fluid in the channel adjacent to the aperture 602. The higher shear force leads to a smaller bubble or microsphere size for the fluid flowing through the aperture 602.

In the embodiment illustrated in FIG. 20, a surface coating 642 is deposited on the surface of sheet or plate 640 and on the internal sidewalls 644 of aperture 646. This coating provides a facilitated way of reducing the diameter of the apertures (244, 244a, 313, 323, 333, 343, 416, 426, 436, 446). The coating material used to form coating 642 may comprise alumina, nickel, gold, or a polymeric material (e.g., Teflon). The coating 642 may be applied to the sheet or plate 640 using known techniques including chemical vapor deposition, metal sputtering, metal plating, sintering, sol coating, polymer coating, and the like. The diameter of the apertures may be controlled by controlling the thickness of the coating 642.

In one embodiment, the apertured sections (240, 240a, 311, 321, 331, 341, 415, 425, 435, 445, 550, 560, 570, 580) may be formed from an asymmetric porous material, for example, a porous material having multiple layers of sintered particles. The number of layers may be two, three, or more. An advantage of these multilayered substrates is that they provide enhanced durability and adhesion. Examples include sintered ceramics that have relatively large pores on one side and relatively small pores on the other side. The relatively small pores may have diameters in the range of about 2 to about 10 nm. The relatively small pores may be positioned in a relatively thin layer of the multilayered substrate. The relatively thin layer may have a thickness in the range of about 1 to about 10 microns. The side with the relatively small pores may be placed facing the interior of the process microchannels (210, 210a, 310, 320, 330, 340, 410, 520) or second fluid stream channels (420, 430) to take advantage of relatively high shear forces to remove the relatively small multiphase mixture bubbles or microspheres as they are formed.

The process microchannels (210, 210a, 310, 320, 330, 340, 410, 520), second fluid stream channels (270, 270a, 350, 360, 420, 430, 530, 540), third fluid stream channels (440, 450) and heat exchange channels (290, 370, 380, 590) along with the associated headers, footers, manifolds, etc., may be made of any material that provides sufficient strength, dimensional stability, corrosion resistance and heat transfer characteristics to permit the operation of the inventive process. These materials include: steel (e.g., stainless steel, carbon steel, and the like); monel; inconel; aluminum; titanium; nickel; platinum; rhodium; copper; chromium; brass; alloys of any of the foregoing metals; polymers (e.g., thermoset resins); ceramics; glass; composites comprising one or more polymers (e.g., thermoset resins) and fiberglass; quartz; silicon; or a combination of two or more thereof.

The first fluid stream may comprise a gas or a liquid. The second fluid stream may comprise a gas or a microbody-forming material. The third fluid stream may comprise a gas.

The gas may comprise any gas. In one embodiment, the gas may comprise one or more of air, oxygen, nitrogen, carbon dioxide, steam, ammonia, ozone, chlorine gas, hydrogen, and the like. The gas may comprise one or more gaseous hydrocarbons, for example, hydrocarbons containing 1 to about 5 carbon atoms. These include saturated and unsaturated hyrocarbons. The hydrocarbons include methane, ethane, ethylene, propane, isopropane, propylene, the butanes, the butylenes, the pentanes, cyclopentane, the pentylenes, cyclopentylene, and the like.

The liquid may comprise any liquid. The liquid may comprise water, an organic liquid, or a combination thereof. The liquid may comprise one or more liquid hydrocarbons. These include hydrocarbon compounds containing from 1 to about 24 carbon atoms, and in one embodiment about 5 to about 24 carbon atoms, and in one embodiment about 6 to about 18 carbon atoms, and in one embodiment about 6 to about 12 carbon atoms. The term "hydrocarbon" denotes a compound having a hydrocarbon or predominantly hydrocarbon character. These hydrocarbon compounds include the following:

(1) Purely hydrocarbon compounds; that is, aliphatic compounds, (e.g., alkane or alkylene), alicyclic compounds (e.g., cycloalkane, cycloalkylene), aromatic compounds, aliphatic- and alicyclic-substituted aromatic compounds, aromatic-substituted aliphatic compounds and aromatic-substituted alicyclic compounds, and the like. Examples include hexane, 1-hexene, dodecane, cyclohexene, cyclohexane, ethyl cyclohexane, benzene, toluene, the xylenes, ethyl benzene, styrene, etc.

(2) Substituted hydrocarbon compounds; that is, hydrocarbon compounds containing non-hydrocarbon substituents which do not alter the predominantly hydrocarbon character of the compound. Examples of the non-hydrocarbon substituents include hydroxy, acyl, nitro, halo, etc.

(3) Hetero substituted hydrocarbon compounds; that is, hydrocarbon compounds which, while predominantly hydrocarbon in character, contain atoms other than carbon in a chain or ring otherwise composed of carbon atoms. The hetero atoms include, for example, nitrogen, oxygen and sulfur.

The liquid may comprise a natural oil, synthetic oil, or mixture thereof. The natural oils include animal oils and vegetable oils (e.g., castor oil, lard oil) as well as mineral oils such as liquid petroleum oils and solvent treated or acid-treated mineral oils of the paraffinic, naphthenic or mixed paraffinic-naphthenic types. The natural oils include oils derived from coal or shale. The oil may be a saponifiable oil from the family of triglycerides, for example, soybean oil, sesame seed oil, cottonseed oil, safflower oil, and the like. The oil may be a silicone oil (e.g., cyclomethicone, silicon methicones, etc.). The oil may be an aliphatic or naphthenic hydrocarbon such as Vaseline, squalane, squalene, or one or more dialkyl cyclohexanes, or a mixture of two or more thereof. Synthetic oils include hydrocarbon oils such as polymerized and interpolymerized olefins (e.g., poly-butylenes, polypropylenes, propylene isobutylene copolymers, etc.); poly(1-hexenes), poly-(1-octenes), poly(1-decenes), etc. and mixtures thereof; alkylbenzenes (e.g., dodecylbenzenes, tetradecylbenzenes, dinonylbenzenes, di-(2-ethylhexyl)benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like. Alkylene oxide polymers and interpolymers and derivatives thereof where the terminal hydroxyl groups have been modified by esterification, etherification, etc., are synthetic oils that may be used. The synthetic oil may comprise a poly-alpha-olefin or a Fischer-Tropsch synthesized hydrocarbon.

The liquid may comprise a normally liquid hydrocarbon fuel, for example, a distillate fuel such as motor gasoline as defined by ASTM Specification D439, or diesel fuel or fuel oil as defined by ASTM Specification D396.

The liquid may comprise a fatty alcohol, a fatty acid ester, or a mixture thereof. The fatty alcohol may be a Guerbet alcohol. The fatty alcohol may contain from about 6 to about 22 carbon atoms, and in one embodiment about 6 to about 18 carbon atoms, and in one embodiment about 8 to about 12 carbon atoms. The fatty acid ester may be an ester of a linear fatty acid of about 6 to about 22 carbon atoms with linear or branched fatty alcohol of about 6 to about 22 carbon atoms, an ester of a branched carboxylic acid of about 6 to about 13 carbon atoms with a linear or branched fatty alcohol of about 6 to about 22 carbon atoms, or a mixture thereof. Examples include myristyl myristate, myristyl palmitate, myristyl stearate, myristyl isostearate, myristyl oleate, myristyl behenate, myristyl erucate, cetyl myristate, cetyl palmitate, cetyl stearate, cetyl isostearate, cetyl oleate, cetyl behenate, cetyl erucate, stearyl myristate, stearyl palmitate, stearyl stearate, stearyl isostearate, stearyl oleate, stearyl behenate, stearyl erucate, isostearyl myristate, isostearyl palmitate, isostearyl stearate, isostearyl isostearate, isostearyl oleate, isostearyl behenate, isostearyl oleate, oleyl myristate, oleyl palmitate, oleyl stearate, oleyl isostearate, oleyl oleate, oleyl behenate, oleyl erucate, behenyl myristate, behenyl palmitate, behenyl stearate, behenyl isostearate, behenyl oleate, behenyl behenate, behenyl erucate, erucyl myristate, erucyl palmitate, erucyl stearate, erucyl isostearate, erucyl oleate, erucyl behenate and erucyl erucate. The fatty acid ester may comprise: an ester of alkyl hydroxycarboxylic acid of about 18 to about 38 carbon atoms with a linear or branched fatty alcohol of about 6 to about 22 carbon atoms (e.g., dioctyl malate); an ester of a linear or branched fatty acid of about 6 to about 22 carbon atoms with a polyhydric alcohol (for example, propylene glycol, dimer diol or trimer triol) and/or a Guerbet alcohol; a triglyceride based on one or more fatty acids of about 6 to about 18 carbon atoms; a mixture of mono-, di- and/or triglycerides based on one or more fatty acids of about 6 to about 18 carbon atoms; an ester of one or more fatty alcohols and/or Guerbet alcohols of about 6 to about 22 carbon atoms with one or more aromatic carboxylic acids (e.g., benzoic acid); an ester of one or more dicarboxylic acids of 2 to about 12 carbon atoms with one or more linear or branched alcohols containing 1 to about 22 carbon atoms, or one or more polyols containing 2 to about 10 carbon atoms and 2 to about 6 hydroxyl groups, or a mixture of such alcohols and polyols; an ester of one or more dicarboxylic acids of 2 to about 12 carbon atoms (e.g., phthalic acid) with one or more alcohols of 1 to about 22 carbon atoms (e.g., butyl alcohol, hexyl alcohol); an ester of benzoic acid with linear and/or branched alcohol of about 6 to about 22 carbon atoms; or mixture of two or more thereof.

The liquid may comprise: one or more branched primary alcohols of about 6 to about 22 carbon atoms; one or more linear and/or branched fatty alcohol carbonates of about 6 to about 22 carbon atoms; one or more Guerbet carbonates based on one or more fatty alcohols of about 6 to about 22 carbon atoms; one or more dialkyl (e.g., diethylhexyl) naphthalates wherein each alkyl group contains 1 to about 12 carbon atoms; one or more linear or branched, symmetrical or nonsymmetrical dialkyl ethers containing about 6 to about 22 carbon atoms per alkyl group; one or more ring opening products of epoxidized fatty acid esters of about 6 to about 22 carbon atoms with polyols containing 2 to about 10 carbon atoms and 2 to about 6 hydroxyl groups; or a mixture of two or more thereof.

The water may be taken from any convenient source. The water may be deionized or purified using osmosis or distillation.

The microbody forming material may comprise any microbody forming material. The microbody forming material may be in the form of a liquid or a solid melt. The microbody forming material may comprise glass, for example, a glass microbody (e.g., microsphere) forming material, a polymer, for example, a polymeric microbody (e.g., polymeric microsphere) forming material. The polymeric microbody forming material may comprise one or more acrylic resins, silicon resins, urethane resins, vinyl acetate resins, teflon resins, polyamide resins, vinyl chloride resins, styrenic resins, phenol resins, epoxy resins, styrene-butadiene-styrene block copolymer resins, styrene-ethylene-butylene-styrene block copolymer resins, styrene-isoprene-styrene block copolymer resins, n-butyl rubber, chloroprene rubber, natural rubber, or a combination of two or more thereof. In one embodiment, the polymeric microbody forming material may comprise a (meth)acrylate ester of an alcohol of 1 to about 14 carbon atoms. In one embodiment, the polymeric microbody forming material may comprise at least one alkyl (meth)acrylate.

Although emulsifiers and/or surfactants are not required for one or more embodiments of the invention, it is possible to use one or more emulsifiers and/or surfactants in forming the multiphase mixtures prepared by the inventive process. The emulsifier and/or surfactant may be premixed with the liquid. The emulsifiers and/or surfactants may comprise ionic or nonionic compounds having a hydrophilic lipophilic balance (HLB) in the range of zero to about 18 in Griffin's system, and in one embodiment about 0.01 to about 18. The ionic compounds may be cationic or amphoteric compounds. Examples include those disclosed in *McCutcheons Surfactants and Detergents,* 1998, North American & International Edition. Pages 1-235 of the North American Edition and pages 1-199 of the International Edition are incorporated herein by reference for their disclosure of such emulsifiers. The emulsifiers and/or surfactants that may be used include alkanolamines, alkylarylsulfonates, amine oxides, poly(oxyalkylene) compounds, including block copolymers comprising alkylene oxide repeat units, carboxylated alcohol ethoxylates, ethoxylated alcohols, ethoxylated alkyl phenols, ethoxylated amines and amides, ethoxylated fatty acids, ethoxylated fatty esters and oils, fatty esters, fatty acid amides, glycerol esters, glycol esters, sorbitan esters, imidazoline derivatives, lecithin and derivatives, lignin and derivatives, monoglycerides and derivatives, olefin sulfonates, phosphate esters and derivatives, propoxylated and ethoxylated fatty acids or alcohols or alkyl phenols, sorbitan derivatives, sucrose esters and derivatives, sulfates or alcohols or ethoxylated alcohols or fatty esters, sulfonates of dodecyl and tridecyl benzenes or condensed naphthalenes or petroleum, sulfosuccinates and derivatives, and tridecyl and dodecyl benzene sulfonic acids. The emulsifiers and/or surfactants may comprise: one or more polyalkylene glycols; one or more partial esters of glycerol or sorbitan and fatty acids containing about 12 to about 22 carbon atoms; or a mixture thereof. The emulsifier and/or surfactant may comprise a pharmaceutically acceptable material such as lecithin. The concentration of these emulsifiers and/or surfactants in the multiphase mixtures made by the inventive process may range up to about 20% by weight of the multiphase mixtures, and in one embodiment in the range from about 0.01 to about 5% by weight, and in one embodiment from about 0.01 to about 2% by weight. In one embodiment, the concentration may be up to about 2% by weight, and in one embodiment up to about 1% by weight, and in one embodiment up to about 0.5% by weight.

In one embodiment, the first fluid stream comprises a liquid stream and the second fluid stream comprises air.

In one embodiment, the first fluid stream comprises a liquid waste stream and the second fluid stream comprises air.

In one embodiment, the first fluid stream comprises a hazardous waste stream and the second fluid stream comprises air.

In one embodiment, the first fluid stream comprises salad dressing or mustard and the second fluid stream comprises nitrogen.

In one embodiment, the first fluid stream comprises a liquid beverage or beer and the second fluid stream comprises carbon dioxide.

In one embodiment, the first fluid stream comprises a bleaching pulp for use in the manufacture of paper and the second fluid stream comprises chlorine.

In one embodiment, the first fluid stream comprises a dispersion of coal in water and the second fluid stream comprises air.

In one embodiment, the first fluid stream comprises motor oil containing entrained water and the second fluid stream comprises nitrogen.

In one embodiment, the first fluid stream comprises cells for a fermentation reaction and the second fluid stream comprises oxygen or air.

In one embodiment, the first fluid stream comprises a liquid reaction medium and the second fluid stream comprises air or oxygen.

In one embodiment, the first fluid stream comprises a reaction medium for conducting a hydrogenation reaction and the second fluid stream comprises hydrogen.

In one embodiment, the first fluid stream comprises a mixture of oil and water and the second fluid stream comprises air or natural gas.

In one embodiment, the first fluid stream comprises a bleaching pulp for use in the manufacture of paper and the second fluid stream comprises oxygen.

In one embodiment, the first fluid stream comprises an edible oil, wine or juice and the second fluid stream comprises nitrogen.

In one embodiment, the first fluid stream comprises water for use in fish farming and the second fluid stream comprises oxygen.

In one embodiment, the first fluid stream comprises water and the second fluid stream comprises ozone.

In one embodiment, the first fluid stream comprises a waste stream or process stream and the second fluid stream comprises carbon dioxide or ammonia.

In one embodiment, the first fluid stream comprises air and the second fluid stream comprises steam.

In one embodiment, the first fluid stream comprises a waste stream or process stream containing volatile organic compounds and the second fluid stream comprises air.

In one embodiment, the first fluid stream comprises a gas or a liquid, and the second fluid stream comprises a microbody-forming material.

In one embodiment, the first fluid stream comprises an aqueous composition and the second fluid stream comprises hydrogen and/or oxygen. This may be used for direct combination for hydrogen peroxide production.

In one embodiment, the first fluid stream comprises a 2-alkylanthraquinone and the second stream comprises hydrogen. This may be used in the production of hydrogen peroxide.

The first fluid stream material may be present in the multiphase mixture made by the inventive process at a concentration in the range from about 0.1 to about 80% by weight, and in one embodiment about 1 to about 50% by weight, and in one embodiment about 1 to about 20% by weight. The second fluid stream material may be present in the multiphase mixture made by the inventive process at a concentration in the range from about 1 to about 95% by weight, and in one embodiment about 10 to about 50% by weight, and in one embodiment about 10 to about 25% by weight. The third fluid stream material, when used, may be present in the multiphase mixture made by the inventive process at a concentration in the range up to about 0.01% to about 50% by weight, and in one embodiment from about 1 to about 15% by weight, and in one embodiment about 0.1 to about 1% by weight.

In one embodiment, the second fluid may dissolve in the first fluid. This may occur in the process microchannel or after the multiphase mixture flows out of the process microchannel. In one embodiment, the second fluid may dissolve in the first fluid within a period of up to about 10 hours after being mixed with the first fluid, and in one embodiment within a period of up to about 1 hour.

The inventive multiphase mixtures may contain one or more particulate solids. These may be premixed with the first, second and/or third liquid. The particulate solids may be organic, inorganic, or a combination thereof. The particulate solids may comprise catalysts (e.g., combustion catalysts such as $CeO_2/BaAl_{12}O_{19}$, $Pt/Al_2O_3$, etc., polymerization catalysts, and the like), pigments (e.g., $TiO_2$, carbon black, iron oxides, etc.), fillers (e.g., mica, silica, talcum, barium sulfate, polyethylenes, polytetrafluoroethylene, nylon powder, methyl methacrylate powder), etc. The particulate solids may comprise nanosize particles. The particulate solids may have a mean particle diameter in the range of about 0.001 to about 10 microns, and in one embodiment about 0.01 to about 1 micron. The concentration of the particulate solids in the multiphase mixtures may range up to about 70% by weight, and in one embodiment from about 0.1 to about 30% by weight based on the weight of the multiphase mixture.

In one embodiment, the multiphase mixture made by the inventive process comprises a discontinuous phase dispersed in a continuous phase. The discontinuous phase may comprise bubbles or microbodies having a volume-based mean dimension (e.g., diameter, height, width, length) in the range up to about 200 microns, and in one embodiment about 0.01 to about 200 microns, and in one embodiment from about 0.01 to about 100 microns, and in one embodiment about 0.01 to about 50 microns, and in one embodiment about 0.01 to about 25 microns, and in one embodiment about 0.01 to about 10 microns, and in one embodiment about 0.01 to about 5 microns, and in one embodiment about 0.01 to about 2 microns, and in one embodiment about 0.01 to about 1 micron, and in one embodiment about 0.01 to about 0.5 micron, and in one embodiment about 0.01 to about 0.2 micron, and in one embodiment about 0.01 to about 0.1 micron, and in one embodiment about 0.01 to about 0.08 micron, and in one embodiment about 0.01 to about 0.05 micron, and in one embodiment about 0.01 to about 0.03 micron. An advantage of the inventive process is that at least in one embodiment the bubbles or microbodies may be characterized by having a relatively narrow distribution of average diameters (or heights, widths or lengths).

"Relative span" is often referred to as "span." It is a dimensionless parameter calculated from volume distribution. As with volume median bubble or microbody size (VMD), D[v, 0.1] and D[v,0.9] are diameters (or heights, widths or lengths) representing the points at which 10% and 90%, respectively, of the volume of bubbles or microbodies dispersed is in bubbles or microbodies of smaller diameter. The span may be defined as D[v,0.9] minus D[v,0.1] which is then divided by the VMD (D[v,0.5]). In one embodiment, the span for the bubbles or microbodies in multiphase mixtures made by the inventive process may be in the range from about 1.3 to about 5, and in one embodiment about 1.8 to about 2.5. In one embodiment, the inventive process may be conducted in a single process microchannel and the span may be in the range of from about 1.3 to about 2.5. In one embodiment, the inventive process may be conducted in a scaled-up multiphase mixing process employing multiple process microchannels and the span may be in the range from about 1.3 to about 5.

In one embodiment, the volume-based mean diameter (or height, width or length) for the bubbles or microbodies in the multiphase mixtures made by the inventive process may be in the range from about 0.1 to about 100 microns, and the span may be in the range from about 1 to about 25. In one embodiment, the volume-based mean diameter (or height, width or length) may be in the range from about 1 to about 10 microns, and the span may be in the range from about 1.8 to about 2.5.

In one embodiment, gas bubbles are formed, the gas bubbles having a volume-based mean diameter in the range of up to about 25 microns, and a span in the range from about 1.9 to about 2.5.

In one embodiment, microbodies are formed, the microbodies having a volume-based mean diameter (or height, width or length) in the range up to about 5 microns, and a span in the range from about 1.8 to about 2.5.

The microbodies formed by the inventive process have numerous applications. These include glass microspheres for cast filings to reduce density, glass microspheres for select species immobilization in fluidized bed reactors, and the like. Other examples include microsphere polymer, gel or colloidal suspension generation used for immunologic testing and treatment. The microbodies (e.g., microspheres) may be treated in a second process to form an aggregate, encapsulated solid for several applications including catalytic fluidized or packed beds, drug delivery systems (e.g., protein enzymatic reactions), and advanced separations and fluidized bed applications (e.g., a coated magnetic support that can preferentially be separated or excited by magnetic vibration).

An advantage of the inventive process, at least in one embodiment, is that the gap distances between the process microchannels, second fluid stream channels, and, optionally, third fluid stream channels and/or heat exchange channels may be the same whether the process is intended for laboratory or pilot plant scale or for full production scale. As a result, the particle size distribution of the multiphase mixtures produced by the microchannel mixers used with the inventive process may be substantially the same whether the microchannel mixer is built on a laboratory or pilot plant scale or as a full scale plant unit.

Shear force on a liquid control element (in discretized form) in the direction of velocity u may be calculated by the formula $F_x=mu*du/dy$, where mu is viscosity, and du/dy is the velocity gradient for the liquid flow normal to the apertured section. However, as in a location of liquid (represented by a control element) the velocity generally has three components, and shear force also has three components. For a channel flow near and at the surface, a one dimensional assumption can be made and $F_x$ can approximate the net shear at an element surface of the liquid. The use of computational fluid dynamics, including commercial software packages such as Fluent or FEMLAB, may be used to solve the required transport equations such that the surface shear force may be calculated. The surface shear force may be calculated along the channel length, parallel to the direction of flow. Shear force may also be calculated between parallel channels, where flow distribution effects are included to determine the mass flux into each parallel channel as a function of the detailed channel and manifold geometry. Additional calculation methods can be found, for example, in "Fundamentals of Fluid Mechanics," $3^{rd}$ Ed., B. R. Munson, D. F. Young and T. H. Okiishi, John Wiley & Son, Inc., Weinheim, 1998.

In one embodiment, the shear force deviation factor (SFDF) for a process employing a single process microchannel may be within about 50% of the SFDF for a scaled-up process involving multiple process microchannels. SFDF may be calculated using the formula $$SFDF=(F_{max}-F_{min})/(2F_{mean})$$

wherein: $F_{max}$ is the maximum shear force in a process microchannel for a specific liquid; $F_{min}$ is the minimum shear force in the process microchannel for the liquid; and $F_{mean}$ is the arithmetic average shear force for the liquid at the surface of the apertured section (240, 240a, 311, 321, 331, 341, 415, 425, 435, 445, 550, 560, 570, 580) within the process microchannel. Within a single process microchannel, operated in accordance with the inventive process, the SFDF may be less than about 2, and in one embodiment less than about 1, and in one embodiment less than about 0.5, and in one embodiment less than about 0.2.

In one embodiment, the inventive process may provide for a relatively uniform shear force while employing multiple process microchannels. To measure the shear force uniformity among multiple process microchannels, the average shear force is calculated for each channel and compared. $F_{max}$ is the largest value of the average channel shear force, and $F_{min}$ is the smallest value of the average shear force. $F_{mean}$ is the mean of the average shear forces of all the channels. SFDF may be calculated from these values. Among multiple process microchannels, at least with one embodiment of the inventive process, the SFDF may be less than about 2, and in one embodiment less than about 1, and in one embodiment less than about 0.5, and in one embodiment less than about 0.2.

The heat exchange fluid may comprise any fluid. These include air, steam, liquid water, gaseous nitrogen, liquid nitrogen, other gases including inert gases, carbon monoxide, carbon dioxide, molten salt, oils such as mineral oil, gaseous hydrocarbons, liquid hydrocarbons, and heat exchange fluids such as Dowtherm A and Therminol which are available from Dow-Union Carbide.

The heat exchange fluid may comprise the first, second and/or third fluid used in making the multiphase mixtures. This can provide process pre-heat or pre-cooling and increase overall thermal efficiency of the process.

In one embodiment, the heat exchange channels comprise process channels wherein an endothermic or exothermic process is conducted. These heat exchange process channels may be microchannels. Examples of endothermic processes that may be conducted in the heat exchange channels include steam reforming and dehydrogenation reactions. In one embodiment, the incorporation of a simultaneous endothermic reaction to provide an improved heat sink may enable a typical heat flux of roughly an order of magnitude or more above the convective cooling heat flux. Examples of exothermic processes that may be conducted in the heat exchange channels include water-gas shift reactions, methanol synthesis reactions and ammonia synthesis reactions.

In one embodiment, the heat exchange fluid undergoes a phase change in the heat exchange channels. This phase change provides additional heat addition or removal from the process microchannels or liquid channels beyond that provided by convective heating or cooling. For a liquid heat exchange fluid being vaporized, the additional heat being transferred from the process microchannels would result from the latent heat of vaporization required by the heat exchange fluid. An example of such a phase change would be an oil or water that undergoes nucleate boiling. In one embodiment, the vapor mass fraction quality of the boiling of the phase change fluid may be up to about 100%, and in one embodiment up to about 75%, and in one embodiment up to about 50%.

The use of enhanced heat transfer from phase change or a chemical reaction may be more advantageous when multiphase mixture generation occurs in coordination with a chemical reaction in the process channels. In one embodiment, the multiphase mixture may be, for example, a reactive monomer for a polymerization reaction or other and as such require additional heat exchange.

The heat flux for convective heating or cooling in the microchannel mixer may be in the range from about 0.01 to about 125 watts per square centimeter of surface area of the process microchannels (W/cm$^2$) in the microchannel mixer, and in one embodiment about 0.1 to about 50 W/cm$^2$, and in one embodiment about 1 to about 25 cm$^2$, and in one embodiment from about 1 to about 10 W/cm$^2$. The heat flux for phase for heating or cooling may be in the range from about 1 to about 250 W/cm$^2$, and in one embodiment, from about 1 to about 100 W/cm$^2$, and in one embodiment from about 1 to about 50 W/cm$^2$, and in one embodiment from about 1 to about 25 W/cm$^2$, and in one embodiment from about 1 to about 10 W/cm$^2$.

The heat exchange channels may be used to provide sterile conditions during formation of the multiphase mixtures using the inventive process. Unlike batch mixers, the inventive process may be closed to the environment and does not need an inert gas blanket for isolation from the environment. The heat exchange channels, which may be adjacent to the process microchannels or liquid channels may provide relatively short heat transport and diffusion distances which permits rapid heating and cooling of the liquids in the microchannel mixer with decreased temperature gradients. As a result, multiphase mixtures that are not suitable for prolonged heating or would degrade under large temperature gradients may be prepared using the inventive process. In one embodiment, the temperature gradients between the process microchannel walls and the bulk flow within the process microchannels at the same axial position in the process microchannels may be less than about 5° C., and in one embodiment less than about 2° C., and in one embodiment less than about 1° C.

Heat exchange channels in close proximity to the process microchannels and/or second or third fluid stream channels with controlled heating and/or cooling may provide for uniform temperature profiles between multiple process microchannels. This enables uniform heating and cooling at more rapid rates than can be obtained with conventional processing equipment such as mixing tanks. In a multichannel microchannel mixer, at least some axial position along the process flow length the temperature difference between the process microchannels may be less than about 5° C., and in one embodiment less than about 2° C., and in one embodiment less than about 1° C.

The heat exchange channels adjacent to either the process microchannels and/or second or third fluid stream liquid channels may employ temperature zones along the length of such channels. In one embodiment, the temperature in a first zone near the entrance to the process microchannel is maintained at a temperature above a second temperature in a second zone near the end of the process microchannel. A cool down or quench zone may be incorporated into the process microchannel to quickly cool and stabilize the multiphase mixture. Numerous combinations of thermal profiles are possible, allowing for a tailored thermal profile along the length of the process microchannel including the possibility of sections both before and/or after the mixing zone in the process microchannel to heat and/or cool the feed and or multiphase mixture products.

The flow rate of fluid through the process microchannels (210, 210a, 310, 320, 330, 340, 410, 520) may be in the range from about 0.01 to about 50 lpm, and in one embodiment about 0.01 to about 10 lpm. The velocity of fluid flowing through the process microchannels may be in the range from about 0.1 to about 100 m/s, and in one embodiment about 0.1 to about 10 m/s. The Reynolds Number for the fluid flowing through the process microchannels may be in the range from about 25 to about 10,000, and in one embodiment about 250 to about 5000. The temperature of the fluid entering the process microchannels may be in the range from about 10° C. to about 550° C., and in one embodiment about 25° C. to about 400° C. The absolute pressure within the process microchannels may be in the range from about 1 to about 20 atmospheres, and in one embodiment about 1 to about 5 atmospheres.

The flow rate of the second fluid stream through the second fluid stream channels (270, 270a, 350, 360, 420, 430, 530, 540) and the third fluid stream through the third fluid stream channels (440, 450) may be in the range from about 0.01 to about 10 ml/s, and in one embodiment about 0.1 to about 2 ml/s. The velocity of the second fluid stream and the third fluid stream may be in the range from about 0.1 to about 100 m/s, and in one embodiment about 0.1 m/s to about 10 m/s. The Reynolds Number for the second fluid stream and the third fluid stream may be in the range from about 50 to about 5000, and in one embodiment about 50 to about 500. The temperature of the second fluid stream entering the second fluid stream channels and the third fluid stream entering the third fluid stream channels may be in the range from about −10° C. to about 650° C., and in one embodiment about 25° C. to about 450° C. The absolute pressure within the second fluid stream channels and the third fluid stream channels may be in the range from about 1 to about 25 atmospheres, and in one embodiment about 1 to about 5 atmospheres. The pressure drop for the fluid flowing through the apertures (244, 244*a*, 313, 323, 333, 343, 416, 426, 436, 446) may be in the range from about 0.005 to about 0.5 atmospheres, and in one embodiment about 0.05 to about 0.1 atmospheres.

The formation of gas bubbles or microbodies with the inventive process is shown schematically in FIG. 21. Referring to FIG. 21, gas bubbles or microbodies 650 emerge from apertures 652 in microchannel 654 and are dispersed in the first fluid stream 656. While attached to the gas or microbody-forming material stems 658 within the apertures 652, the gas bubbles or microbodies may grow in size, for example, to about 10 times the size of the apertures or larger. Eventually, shear force at the base of the gas or microbody-forming material stems 658 detaches the bubbles or microbodies from the apertures and the bubbles or microbodies disperse in the first fluid stream 656. In one embodiment, a relatively high pressure drop across the apertured section or a correspondingly high second fluid stream flow rate through the second fluid stream channel may not be necessary to achieve dispersion of the second fluid stream in the first fluid stream. A low pressure drop or low flow rate may lead to smaller bubbles or microbodies, as lower inertia of the second fluid stream flowing through the apertured section may reduce bubble or microbody growth before the bubbles or microbodies detach from the apertures.

The multiphase mixture exiting the process microchannels (210, 210*a*, 310, 320, 330, 340, 410, 520) may be at a temperature in the range from about 10° C. to about 600° C., and in one embodiment about 25° C. to about 450° C.

The heat exchange fluid entering the heat exchange channels (290, 370, 380, 590) may have a temperature in the range from about −40° C. to about 300° C., and in one embodiment about 25° C. to about 100° C. The heat exchange fluid exiting the heat transfer channels may have a temperature in the range from about −30° C. to about 550° C., and in one embodiment about 30° C. to about 200° C. The pressure drop for the heat exchange fluid as it flows through the heat exchange channels may be in the range from about 0.005 to about 5 atmospheres, and in one embodiment from about 0.05 to about 1 atmosphere. The Reynolds Number for the flow of heat exchange fluid flowing through the heat exchange channels may be in the range up to about 10,000, and in one embodiment up to about 5000, and in one embodiment in the range from about 100 to about 5000, and in one embodiment about 500 to about 2000.

The fluid streams may be preheated in the microchannel mixer or prior to entering the microchannel mixer using any type of heat transfer device, including a microchannel heater or a heat pipe. In one embodiment, the first fluid stream may be preheated in the non-apertured region of the process microchannels upstream of the mixing zone. The multiphase mixture produced in the microchannel mixer may be cooled in the microchannel mixer or upon exiting the microchannel mixer using any type of heat exchange device, including a microchannel heat exchanger. In one embodiment, the multiphase mixture may be quenched to stabilize the multiphase mixture or lock it in. In one embodiment, the multiphase mixture may be quenched in the non-apertured region of the process microchannel down stream from the mixing zone. In one embodiment, the multiphase mixture may be cooled to room temperature or quenched in a period in the range from about 0.01 to about 100 seconds, and in one embodiment about 0.01 to about 10 seconds.

The inventive process may be used to make a multiphase mixture at a rate of at least about 0.01 liter per minute, and in one embodiment at least about 1 liter per minute. In one embodiment, the process may be used to make a multiphase mixture at a rate of at least about 10 liters per second.

In one embodiment, optical or thermal-optical features may be adjusted in the process microchannel. Examples of techniques for measuring and/or adjusting these optical or thermal-optical features include: in-line LSD (laser scattering diffraction) detection for multiphase mixture quality control and analysis including mean droplet size and span; viscometers for assessing product viscosity and solids loading; optical measurement using photographs for gas bubble or microsphere size measurement; holographic imaging including interferometry via adjusting multiphase mixture properties; and the like.

Example 1

A multiphase mixing apparatus comprising an acrylic process microchannel having a rectangular cross-section and internal dimensions of 0.040×1.25×3 inches (1.02×31.75×76.2 mm) is constructed. The process microchannel has an apertured section in one of its sidewalls. The apertured section has a nominal aperture or pore size of 0.1 micron and the dimensions of 0.010×1×1.5 inches (0.254×25.4×38.1 mm). The apertured section is constructed of stainless steel 316L and is supplied by Mott Corporation of Farmington, Conn. under Catalogue No. 1110-12-12-018-01-A. The apertured section is connected to a gas distribution plenum and tubing to permit the flow of gas through the apertured section into the process microchannel. The process microchannel is connected to tubing to permit the flow of liquid through the process microchannel. The gas flows through the apertured section into the process microchannel in contact with the liquid flowing through the process microchannel. As the gas flows through the apertures of the apertured section, it forms bubbles in the process microchannel. The process is conducted using air as the gas and deionized water as the liquid. The flow rate of the air is varied between 2 and 20 standard cubic centimeters per minute (SCCM) and the flow rate of the water is varied between 10 and 80 milliliters per minute (ml/min). Bubbles having diameters in the range of 5 to 15 microns are formed.

Example 2

The process described in Example 1 is performed using a gas flow rate of 2 SCCM and a liquid flow rate of 60 ml/min.

Example 3

The process described in Example 1 is performed using hydrogen as the gas and 1-hexene as the liquid.

Example 4

A high velocity of gas (flow rate greater than 1 SLPM) and liquid (flow rate greater than 0.1 liter per minute) are mixed near the entrance of a process microchannel before flowing through a surface feature region. The surface feature region has a 0.01" depth and 45° angled features on one side of a wall. The bulk flow channel within the surface feature is 0.0065". A foam is produced with uniform bubbles that are below 25 microns in average diameter. The flow length is 1.5 inches and the width or span of the channel is 0.5 inch. The process microchannel is at room temperature and near ambient pressure. Very small bubbles are observed moving above and through the surface feature region.

Example 5

The addition of surface features to two sides of a microchannel to induce a change from laminar flow in the channel to a strongly mixing flow in the channel is investigated via computational fluid dynamics (CFD) simulations using Fluent™. For the simulation, fluid properties are assumed to be constant, with a density of 5.067 kg/m$^3$, and a viscosity of 3.62e-5 kg/m-s. A uniform inlet velocity of 12.13 m/s and a no-slip flow condition at all walls are imposed as boundary conditions. A grid size of 315,174 cells is used.

Figure 27:
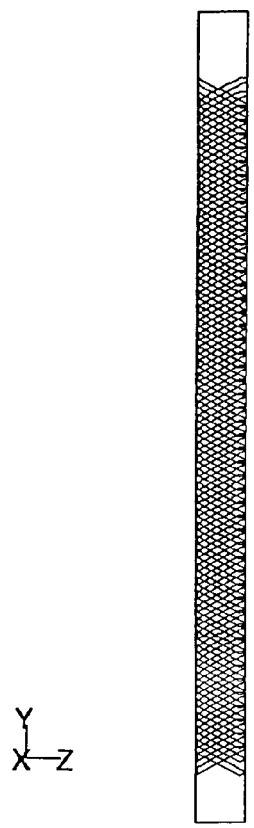
FIG. 27 is a plan view of geometry of surface features simulated by computational fluid dynamics (CFD) as described in Example 5, the surface features on both upper and lower walls being visible.
Figure 28:
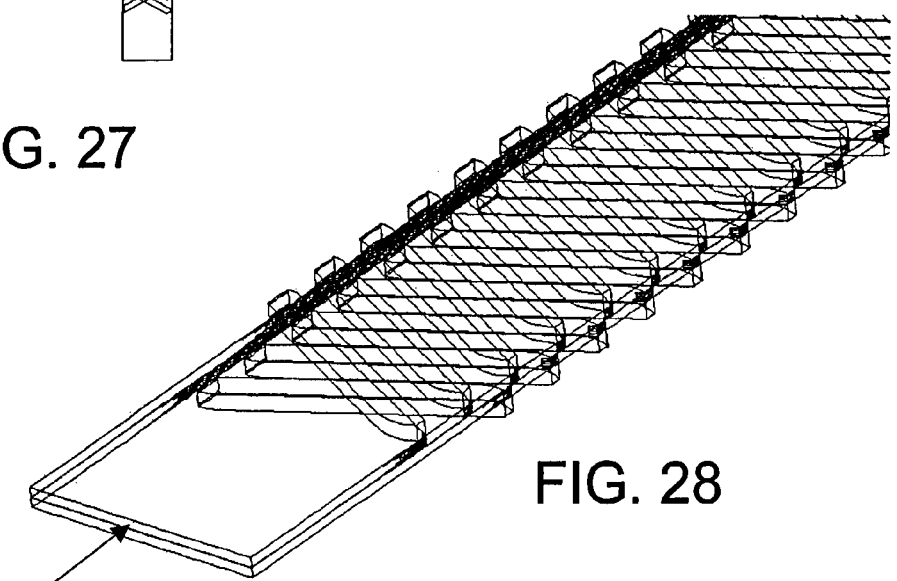
FIG. 28 is an isometric view of a microchannel with surface features simulated by CFD as described in Example 5.

The assumed geometry is a rectangular cross section for the continuous channel, with a width of 4.06 mm, a height of 0.318 mm, and a length of 63.5 mm. The section from 0 to 3.5 mm downstream from the inlet and the section 5.0 to 0 mm upstream of the outlet contains no mixing surface features (simple rectangular microchannel). The mixing surface features (or grooves) are cut into two opposing walls, each feature being approximately rectangular in cross section. The middle section of the microchannel (from 3.5 mm to 58.5 mm downstream of the inlet) contains the mixing surface features. The surface features span one of the channel walls diagonally at an angle of 63° from the direction of the mean bulk laminar flow, as shown in FIGS. 27 and 28. Each surface feature is about 0.25 mm deep by 0.48 mm wide, by 9 mm long. Surface features are placed parallel to one another with a spacing of 0.48 mm between features. The surface features on the opposing wall are the same as those on the first wall, rotated 180° about the channel centerline (the channel geometry is symmetric about the axis of flow extending from the centerpoint of the inlet plane to the centerpoint of the outlet plane).

Figure 29:
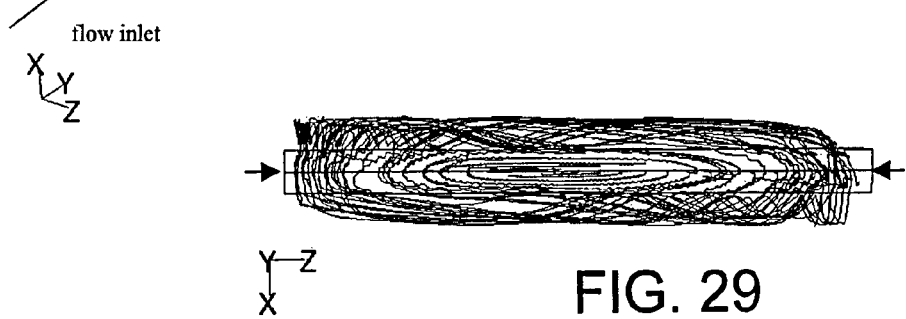
FIG. 29 illustrates pathlines of flow in a microchannel beginning along the horizontal centerline (running between the arrows) of the inlet plane looking down the axis of flow from the inlet plane as described in Example 5.
Figure 30:
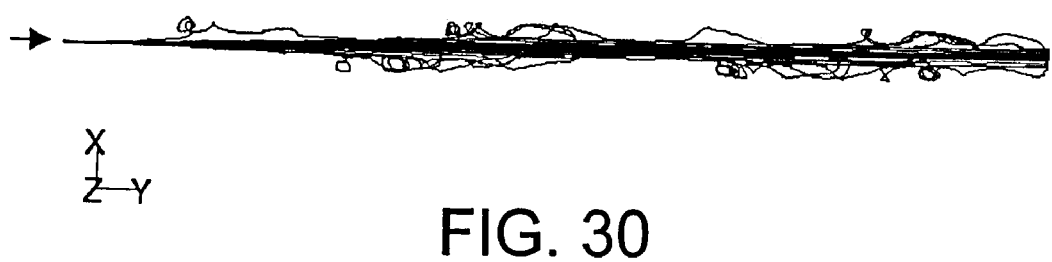
FIG. 30 shows pathlines of flow in a microchannel beginning along the horizontal centerline of the inlet plane (arrow shows direction of flow) as viewed from the side as described in Example 5.
Figure 31:
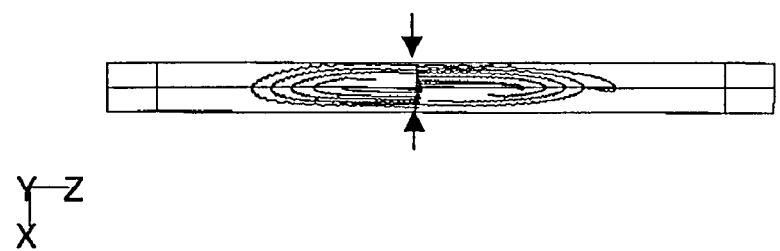
FIG. 31 shows pathlines of flow in a microchannel beginning along the vertical centerline (running between the arrows) of the inlet plane looking down the axis of flow from the inlet plane as described in Example 5.

FIG. 27 shows a plan view of the geometry of surface features simulated by CFD where mixing features on both upper and lower walls are superimposed. FIG. 28 shows an isometric view of the microchannel with mixing features simulated by CFD, showing the direction of flow entering the channel. FIG. 29 shows typical pathlines of flow beginning along the horizontal centerline (running between the arrows) of the inlet plane looking down the axis of flow from the inlet plane. In classical laminar flow, pathlines flow in a straight line between the inlet and outlet planes (for the view shown in FIG. 29, a classical laminar flow pathlines would not deviate from the centerline between the arrows.) In FIG. 30, a side view of the same pathlines of flow beginning along the horizontal centerline of the inlet plane (arrow shows direction of flow) is shown. In FIG. 30, the spread of the flow pathlines from the centerline and the swirling motion in the surface features, show improved mixing and decreased heat and mass transport resistance relative to laminar flow. FIG. 31 shows the pathlines of flow beginning along the vertical centerline of the inlet plane (running between the arrows) looking down the axis of flow from the inlet plane. In FIG. 31, the swirling motion of the flow suggests enhanced mixing and decreased heat and mass transport resistance relative to classical laminar flow.

The results of the CFD simulations show that, unlike laminar flow in a microchannel, the mixing surface features cause the pathlines of the flow in the continuous channel to twist and swirl, spreading toward the walls faster than would be expected in the case of laminar flow. The calculated pressure drop is 5.2 kPa.

It is anticipated that adding a gas or second fluid stream to the microchannel containing surface features would create a flow pattern whereby the multiphase mixture approaches plug flow and the bubbles are small and well dispersed. Small bubbles may be defined as being less than 25% of the microchannel gap.

While the invention has been explained in relation to specific embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A process for making a multiphase mixture, comprising:
   flowing a first fluid stream in a process microchannel, the first fluid stream comprising at least one liquid;
   flowing a second fluid stream in the process microchannel in contact with the first fluid stream to form the multiphase mixture, the second fluid stream comprising at least one gas, the first fluid stream forming a continuous phase in the multiphase mixture, the second fluid stream forming a discontinuous phase dispersed in the continuous phase.

2. The process of claim 1 wherein heat is exchanged between the process microchannel and a heat source and/or heat sink.

3. The process of claim 2 wherein the heat source and/or heat sink comprises at least one heat exchange channel.

4. The process of claim 3 wherein a heat exchange fluid is in the heat exchange channel.

5. The process of claim 4 wherein the heat exchange fluid undergoes a phase change in the heat exchange channel.

6. The process of claim 4 wherein the heat exchange fluid comprises air, steam, liquid water, carbon monoxide, carbon dioxide, gaseous nitrogen, liquid nitrogen, at least one gaseous hydrocarbon, at least one liquid hydrocarbon, or a combination of two or more thereof.

7. The process of claim 4 wherein the heat exchange fluid comprises the first fluid stream, the second fluid stream, or a mixture of the first fluid stream and the second fluid stream.

8. The process of claim 3 wherein an endothermic process is conducted in the heat exchange channel.

9. The process of claim 3 wherein an exothermic process is conducted in the heat exchange channel.

10. The process of claim 3 wherein the heat exchange channel comprises a microchannel.

11. The process of claim 2 wherein the heat source comprises an electric heating element and/or resistance heater.

12. The process of claim 2 wherein the heat sink comprises a non-fluid cooling element.

13. The process of claim 1 wherein a second fluid stream channel is positioned adjacent to the process microchannel and the second fluid stream flows from the second fluid stream channel into the process microchannel.

14. The process of claim 13 wherein heat is exchanged between the process microchannel and a heat source and/or heat sink, the second fluid stream channel and a heat source and/or heat sink, or both the process microchannel and the second fluid stream channel and a heat source and/or heat sink.

15. The process of claim 13 wherein the process microchannel and the second fluid stream channel have a common wall and an apertured section is positioned in the common wall, the second fluid stream flowing from the second fluid stream channel through the apertured section into the process microchannel.

16. The process of claim 1 wherein the first fluid stream and the second fluid stream contact each other in a mixing zone in the process microchannel.

17. The process of claim 16 wherein the process microchannel has a restricted cross section in the mixing zone.

18. The process of claim 1 wherein the first fluid stream comprises 2-alkylanthraquinone and the second fluid stream comprises hydrogen.

19. The process of claim 18 wherein the multiphase mixture reacts to form hydrogen peroxide.

20. The process of claim 1 wherein the multiphase mixture comprises at least one emulsifier and/or surfactant.

21. The process of claim 20 wherein the emulsifier and/or surfactant comprises an alkylaryl sulfonate, amine oxide, carboxylated alcohol ethoxylate, ethoxylated alcohol, ethoxylated alkyl phenol, ethoxylated amine, ethoxylated amide, ethoxylated fatty acid, ethoxylated fatty esters, ethoxylated fatty oil, fatty ester, glycerol ester, glycol ester, sorbitan ester, imidazoline derivative, lecithin, lecithin derivative, lignin, lignin derivative, monoglyceride, monoglyceride derivative, olefin sulfonate, phosphate ester, phosphate ester derivative, propoxylated fatty acid, ethoxylated fatty acid, propoxylated alcohol or alkyl phenol, ethoxylated alcohol or alkyl phenol, sorbitan derivative, sucrose ester, sulfonate of dodecyl or tridecyl benzene, naphthalene sulfonate, petroleum sulfonate, tridecyl or dodecyl benzene sulfonic acid, sulfosuccinate, sulfosuccinate derivative, or mixture of two or more thereof.

22. The process of claim 20 wherein the emulsifier and/or surfactant comprises: at least one polyalkylene glycol; at least one partial ester of glycerol and/or sorbitan and one or more fatty acids; or a mixture thereof.

23. The process of claim 1 wherein the first fluid stream comprises an aqueous composition and the second fluid stream comprises hydrogen and/or oxygen.

24. The process of claim 23 wherein the multiphase mixture reacts to form hydrogen peroxide.

25. The process of claim 1 wherein the first fluid stream comprises an organic compound and the second fluid stream comprises hydrogen and/or oxygen.

26. The process of claim 25 wherein the multiphase mixture reacts to form hydrogen peroxide.

27. The process of claim 1 wherein the multiphase mixture further comprises solid particulates dispersed in the first fluid stream.

28. The process of claim 1 wherein the process is conducted in a microchannel mixer, the microchannel mixer comprising a plurality of the process microchannels.

29. The process of claim 1 wherein the discontinuous phase is in the form of gas bubbles having a volume-based mean diameter in the range of up to about 25 microns, and a span in the range from about 1.9 to about 2.5.

30. The process of claim 1 wherein the first fluid stream comprises an aqueous composition.

31. The process of claim 1 wherein the first fluid stream comprises an organic liquid.

32. The process of claim 1 wherein the second fluid stream comprises one or more of air, oxygen, nitrogen, carbon dioxide, steam, ammonia, ozone, chlorine, hydrogen or a hydrocarbon of 1 to about 5 carbon atoms.

33. The process of claim 1 wherein the first fluid stream comprises at least one liquid hydrocarbon.

34. The process of claim 1 wherein the first fluid stream comprises at least one natural oil, synthetic oil, or mixture thereof.

35. The process of claim 1 wherein the first fluid stream comprises at least one liquid derived from a vegetable source, a mineral source, or mixture thereof.

36. The process of claim 1 wherein the first fluid stream comprises at least one fatty alcohol, fatty acid ester, or a mixture thereof.

37. The process of claim 1 wherein the multiphase mixture further comprises one or more: UV protection factors; waxes; consistency factors; thickeners; superfatting agents; stabilizers; cationic, anionic, zwitterionic, amphoteric or nonionic polymers; silicone compounds; fats; waxes; lecithins; phospholipids; biogenic agents; antioxidants; deodorants; antiperspirants; antidandruff agents; swelling agents; insect repellents; self-tanning agents; tyrosine inhibitors; solubilizers; preservatives; perfume oils; or dyes; or a mixture of two or more thereof.

38. The process of claim 1 wherein solids are dispersed in the multiphase mixture.

39. The process of claim 1 wherein pigment is dispersed in the multiphase mixture.

40. The process of claim 1 wherein a catalyst is dispersed in the multiphase mixture.

41. The process of claim 1 wherein the first fluid stream comprises a liquid waste stream or a hazardous waste stream.

42. The process of claim 1 wherein the first fluid stream comprises a reaction medium for conducting a hydrogenation reaction.

43. The process of claim 1 wherein the process produces at least 1 liter of multiphase mixture per minute.

44. The process of claim 1 wherein the process is conducted in a microchannel mixer, the microchannel mixer comprising a plurality of the process microchannels connected to at least one first fluid stream manifold, the first fluid stream flowing through the at least one first fluid stream manifold to the process microchannels.

45. The process of claim 1 wherein the process microchannel comprises surface features for modifying flow within the process microchannel.

46. The process of claim 1 wherein the first fluid stream comprises a liquid waste stream and the second fluid stream comprises air.

47. The process of claim 1 wherein the first fluid stream comprises a hazardous waste stream and the second fluid stream comprises air.

48. The process of claim 1 wherein the first fluid stream comprises salad dressing or mustard and the second fluid stream comprises nitrogen.

49. The process of claim 1 wherein the first fluid stream comprises a liquid beverage or beer and the second fluid stream comprises carbon dioxide.

50. The process of claim 1 wherein the first fluid stream comprises a bleaching pulp and the second fluid stream comprises chlorine.

51. The process of claim 1 wherein the first fluid stream comprises a dispersion of coal in water and the second fluid stream comprises air.

52. The process of claim 1 wherein the first fluid stream comprises motor oil containing entrained water and the second fluid stream comprises nitrogen.

53. The process of claim 1 wherein the first fluid stream comprises cells for a fermentation reaction and the second fluid stream comprises oxygen or air.

54. The process of claim 1 wherein the first fluid stream comprises a liquid reaction medium and the second fluid stream comprises air or oxygen.

55. The process of claim 1 wherein the first fluid stream comprises a reaction medium for conducting a hydrogenation reaction and the second fluid stream comprises hydrogen.

56. The process of claim 1 wherein the first fluid stream comprises a mixture of oil and water and the second fluid stream comprises air or natural gas.

57. The process of claim 1 wherein the first fluid stream comprises a bleaching pulp and the second stream comprises oxygen.

58. The process of claim 1 wherein the first fluid stream comprises an edible oil, wine or juice and the second fluid stream comprises nitrogen.

59. The process of claim 1 wherein the first fluid stream comprises water for use in fish farming and the second fluid stream comprises oxygen.

60. The process of claim 1 wherein the first fluid stream comprises water and the second fluid stream comprises ozone.

61. The process of claim 1 wherein the first fluid stream comprises a waste or process stream and the second fluid stream comprises carbon dioxide or ammonia.

62. The process of claim 1 wherein the first fluid stream comprises a waste stream containing volatile organic compounds and the second fluid stream comprises air.

63. The process of claim 1 wherein the multiphase mixture comprises a foam.

* * * * *